(12) United States Patent
Greata et al.

(10) Patent No.: US 8,131,804 B2
(45) Date of Patent: Mar. 6, 2012

(54) METHOD AND APPARATUS FOR IMMUNIZING DATA IN COMPUTER SYSTEMS FROM CORRUPTION

(76) Inventors: J Michael Greata, Ipswich, MA (US); Jerrold M Deisenroth, Concord, MA (US)

(*) Notice: Subject to any disclaimer, the term of this patent is extended or adjusted under 35 U.S.C. 154(b) by 1008 days.

(21) Appl. No.: 11/164,122

(22) Filed: Nov. 10, 2005

(65) Prior Publication Data

US 2006/0168053 A1 Jul. 27, 2006

Related U.S. Application Data

(63) Continuation-in-part of application No. 10/993,920, filed on Nov. 19, 2004.

(51) Int. Cl.
*G06F 15/16* (2006.01)

(52) U.S. Cl. .......................................... 709/206; 726/22

(58) Field of Classification Search .................... 709/206
See application file for complete search history.

(56) References Cited

U.S. PATENT DOCUMENTS

| | | | |
|---|---|---|---|
| 5,434,562 A | 7/1995 | Reardon | |
| 5,842,002 A | 11/1998 | Schnurer et al. | 395/500 |
| 5,893,084 A | 4/1999 | Morgan et al. | |
| 6,357,008 B1 | 3/2002 | Nachenberg | |
| 6,401,210 B1 | 6/2002 | Templeton | |
| 6,650,890 B1* | 11/2003 | Irlam et al. | 455/412.1 |
| 6,684,257 B1* | 1/2004 | Camut et al. | 709/246 |
| 6,704,024 B2* | 3/2004 | Robotham et al. | 345/581 |
| 6,732,157 B1* | 5/2004 | Gordon et al. | 709/206 |
| 6,772,196 B1* | 8/2004 | Kirsch et al. | 709/206 |
| 6,775,780 B1 | 8/2004 | Muttik | |
| 6,802,028 B1 | 10/2004 | Ruff et al. | |
| 6,901,519 B1* | 5/2005 | Stewart et al. | 726/24 |
| 6,931,552 B2 | 8/2005 | Pritchard et al. | 713/201 |
| 7,359,978 B2* | 4/2008 | Hinde et al. | 709/229 |
| 7,640,361 B1* | 12/2009 | Green et al. | 709/246 |
| 2002/0169987 A1 | 11/2002 | Meushaw et al. | |
| 2003/0088792 A1* | 5/2003 | Card et al. | 713/201 |
| 2003/0172166 A1* | 9/2003 | Judge et al. | 709/229 |
| 2004/0117648 A1* | 6/2004 | Kissel | 713/200 |
| 2004/0139334 A1 | 7/2004 | Wiseman | |
| 2004/0215977 A1* | 10/2004 | Goodman et al. | 713/201 |
| 2004/0267893 A1* | 12/2004 | Lin | 709/207 |
| 2005/0076084 A1* | 4/2005 | Loughmiller et al. | 709/206 |
| 2005/0076110 A1* | 4/2005 | Mathew et al. | 709/223 |
| 2005/0080864 A1* | 4/2005 | Daniell | 709/206 |
| 2005/0289221 A1* | 12/2005 | Steele | 709/206 |
| 2006/0021029 A1* | 1/2006 | Brickell et al. | 726/22 |
| 2006/0075099 A1* | 4/2006 | Pearson et al. | 709/225 |
| 2006/0288414 A1* | 12/2006 | Kuroda | 726/24 |
| 2008/0137848 A1* | 6/2008 | Kocher et al. | 380/201 |
| 2008/0177994 A1* | 7/2008 | Mayer | 713/2 |
| 2010/0100962 A1* | 4/2010 | Boren | 726/25 |

* cited by examiner

*Primary Examiner* — Bunjob Jaroenchonwanit
(74) *Attorney, Agent, or Firm* — George A. Herbster

(57) ABSTRACT

A system for immunizing a computer network against adverse effects caused by the receipt of a corrupting message. Each message transfers into a protocol-based controlled environment for a specific recipient where message criteria determine whether the incoming message is deemed to be a valid or suspicious message. Transmission criteria determine the final message disposition. If the message is valid, it is delivered to a recipient computer system in the network. If the incoming message is suspicious, the message is isolated in the controlled environment where the transmission criteria may provide remote access to the recipient.

46 Claims, 24 Drawing Sheets

METHOD AND APPARATUS FOR IMMUNIZING DATA IN COMPUTER SYSTEMS FROM CORRUPTION

CROSS-REFERENCE TO RELATED APPLICATION

This application is a continuation-in-part of co-pending U.S. patent application Ser. No. 10/993,920 filed Nov. 19, 2004 for a Method and Apparatus for Immunizing Data in Computer Systems from Corruption.

FIELD OF THE INVENTION

This invention generally relates to security of data processing systems. More specifically this invention relates to a method and apparatus for immunizing one or more computer systems in a network against attacks, as by computer viruses and the like, while preserving useful access to data.

DESCRIPTION OF RELATED ART

Computer systems interconnect through various internal networks and external networks such as the Internet. At a given location, individual computers may connect to the Internet directly. In other locations, one or more individual computers, or users, may interconnect by means of an internal network to a server that connects to the Internet. Both types of systems are susceptible to damage by so-called "viruses". Generally a virus is received as a program or piece of code that typically is part of a "message".

A "message" can take many forms. In browser applications, a "message" may include one or more HTTP (Hyper-Text Transfer Protocol) packets. An e-mail message may contain one or more POP (Post Office Protocol) or SMTP (Simple Mail Transfer Protocol) packets. An IM message will contain one or more packets according to any of several instant messaging protocols. A VoIP message will contain at least one VoIP (Voice over Internet Telephone) packet.

A virus-infected message generally corrupts data by replicating itself in a receiving party's, or "recipient's" computer system or by transmitting itself across a network even bypassing firewalls and other security systems. In the following discussion the phrase "corrupting message" refers to any message that can corrupt the contents of one or more files or otherwise disrupt operations in a computer system.

Companies like Symantec Corporation and MacAfee, Inc. have developed virus detection programs. A virus detection program typically resides on the same hard disk as receives the messages. Such a program compares an incoming message with a set of conditions, often called "definitions" or "signatures," that define known viruses. If an incoming message meets one of these conditions, it is presumed to be a corrupting message and is isolated by being deleted or by being placed in quarantine. As described above, the incoming message is processed in the same memory as other programs. As alternative, it is possible to use a sacrificial machine as a destination for each incoming message. For example, U.S. Pat. No. 5,842,002 (1998) to Schnurer et al. discloses a virus trapping device that is disclosed to detect and eliminate computer viruses before they enter a computer system. More specifically, a trapping device creates a virtual world that simulates a host computer system that is made to fool a computer virus into thinking it is present on a host or target system. Any disruptive behavior occurring within the simulated host computer system is detected and enables the system to remove the virus from the data stream before it is delivered to the host.

U.S. Pat. No. 6,901,519 (2005) to Stewart et al. discloses an e-mail virus immunization system and method that utilizes a sacrificial server. Incoming e-mail messages are forwarded to the sacrificial server where they are converted to non-executable format and sent to the recipient. The sacrificial server can then be checked for virus activity. If any attachments are found to be suspicious, they are also stripped and presented to the recipient.

U.S. Pat. No. 6,931,552 (2005) to Pritchard et al. discloses a host personal computer and a separate sacrificial VTS (Virus Trap computer System) machine. The VTS machine is a separate computer system that receives all communications that are directed to a host personal computer. The VTS machine detects intrusions and includes a virus detector. If a virus is detected, the entire VTS machine is sacrificed and then restored from a secure memory.

Drawbacks characterize each of these systems. First, certain of the foregoing and other approaches to the detection of viruses and prevention of corruption require a priori knowledge of a virus. Thus the system that receives a "yet to be defined" or "new" virus may process a corrupting message with adverse results notwithstanding having tested the message for a virus. This potential for processing of corrupting messages by a given system continues for an indefinite number of days until the virus has been identified and a definition has been transferred to the virus detection system in that given system. A corrupting message that fails to be detected is called a "false negative" message.

Second, virus detection systems are subject to identifying non-corrupted messages as being infected. Any such message is called a "false positive" message. A "false positive" message exists when a virus detection system detects a non-corrupting message as a corrupting message because the non-corrupting accidentally meets a virus detection condition. In many situations the "false positive" message is lost to the recipient even though the message in fact contains no virus. What is needed is a method and apparatus that is easy to implement that: (1) allows known valid messages to pass to the recipient's computer system, (2) immunizes computer systems in a network from the adverse impacts of false positive and false negative messages, and (3) permits the recipient controlled, safe access to those messages that are not deemed to be valid, including false positive messages, for the purpose of viewing and/or manipulating such messages.

SUMMARY

Therefore it is an object of this invention to immunize computer systems in a network from the adverse effects of corrupting messages.

Another object of this invention is to immunize a computer systems in a network from the adverse effects of corrupting messages while allowing a recipient restricted access to some or all messages that appear to be corrupting.

Still another object of this invention is to provide a method and apparatus for immunizing a computer system against the adverse effects that otherwise would occur if a corrupting message were received in a recipient's computer system even before the message is known to be corrupting.

This invention can be applied to a variety of data processing systems, typically to a data processing network including a server machine, or "server", and at least one recipient computer system for receiving messages. The server interfaces the recipient computer system to a communications path over which messages, including potentially corrupting messages, are received.

In accordance with this invention, a recipient's computer system in a data processing network receives messages of a given protocol over a communications path through a server with a message buffer. Immunization is achieved by generating for the recipient an isolated protocol controlled environment set for the incoming message. The isolated controlled environment set includes message criteria by which a message can be determined to be free of corrupting contents and transmission criteria for defining a message disposition. The message buffer receives the message. The received message is processed in the isolated controlled environment set according to the message criteria thereby to select a transmission criterion that controls the disposition of the message.

BRIEF DESCRIPTION OF THE DRAWINGS

The various objects, advantages and novel features of this invention will be more fully apparent from a reading of the following detailed description in conjunction with the accompanying drawings in which like reference numerals refer to like parts, and in which.

DESCRIPTION OF ILLUSTRATIVE EMBODIMENTS

Figure 1:
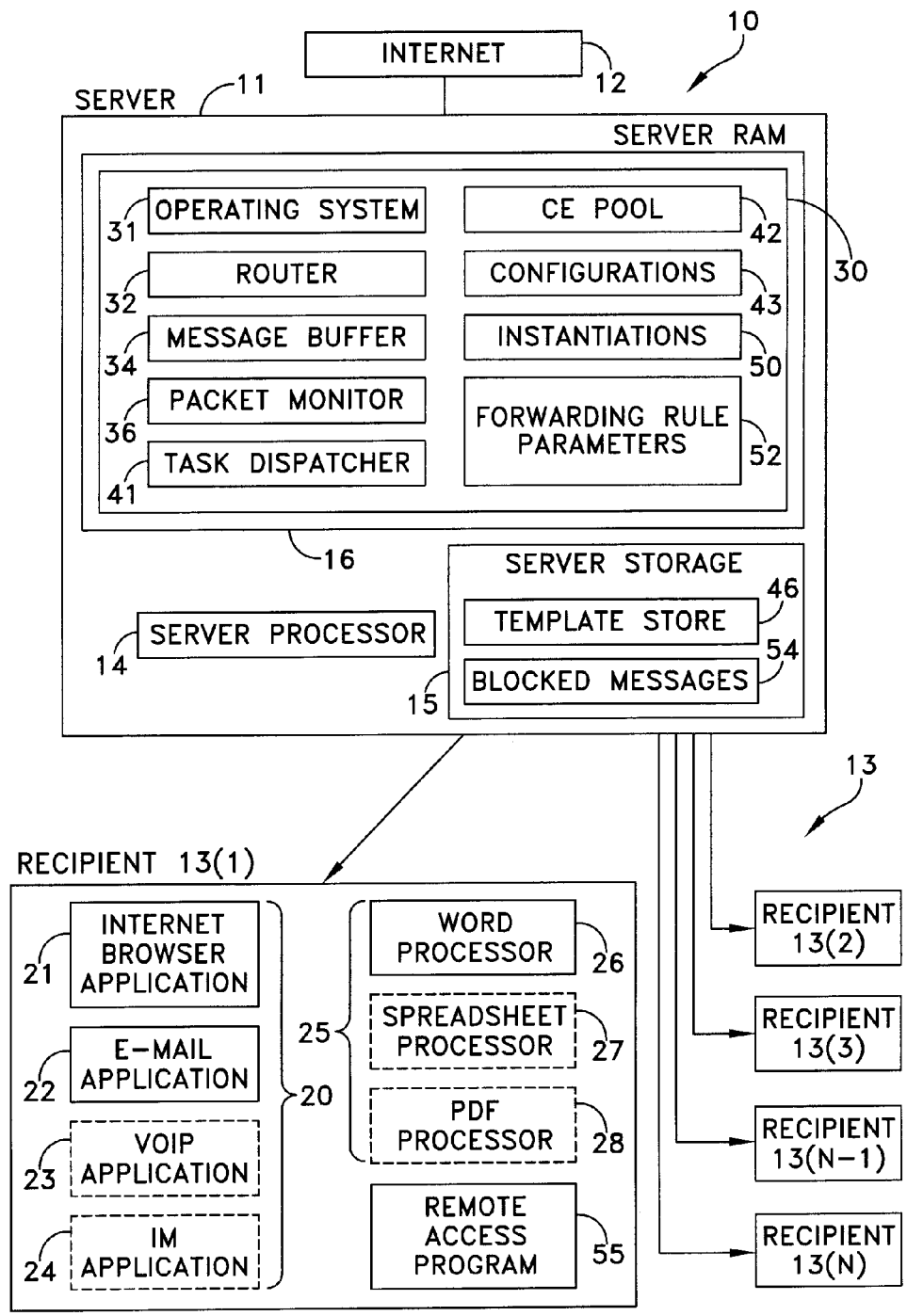
FIG. 1 is a block diagram of a data processing network incorporating one embodiment of an immunization system of this invention.

FIG. 1 depicts a typical data processing network 10 that includes a server 11 interfaced to the Internet 12 as an example of an external communications path over which messages of various protocols comprising one or more data packets can be transmitted and received. The server 11 also connects through an internal network to a plurality or group of "N" recipients 13. Specific recipients 13(1) through 13(3), 13(N−1) and 13(N) are shown. In a conventional data processing network a router (not shown) interconnects the individual network components such as the server 11, the Internet 12 and each of the recipients 13.

The server 11 has a conventional structure. FIG. 1 depicts those elements that are relevant to this invention including a server processor 14, server storage 15 and a server random access memory (RAM) 16. The general operation of these components individually and in concert is well known to those of ordinary skill in the art.

Each recipient 13, such as the recipient 13(1), interacts with the server 11 by means of a device capable of establishing two-way communications over the network 10 and the Internet 12. Such devices include, but are not limited to, workstations, personal computers, certain cell phones and personal digital assistants (PDA's). In the following discussion "recipient" is used interchangeably to designate both the device and the individual using such a device. The exact meaning will be apparent from the context. This invention protects each recipient in a network against a corrupting message from the Internet 12; i.e., a message containing corrupting contents.

Each recipient will have access to applications for implementing different Internet protocols (hereinafter "Internet applications" or "protocol-based applications") and to word processing, spreadsheet, PDF and other applications by which the recipient produces and edits documents and files (hereinafter "production applications"). In FIG. 1, for example, the recipient 13(1) has a set of protocol-based applications 20 including an Internet browser application 21 and an e-mail application 22. Any recipient may include additional protocol-based applications such as a VoIP application 23 and an IM application 24, both shown as dashed boxes to indicate their optional status. In some situations a particular recipient may include alternative embodiments of one or more of these protocol-based applications. For example, it is possible for an individual recipient to include multiple Internet browser applications.

Each of the recipients 13 also includes a set of production applications 25; in FIG. 1 recipient 13(1) includes a word processor 26, a spreadsheet processor 27 and a portable document format (PDF) processor 28.

Immunization System 30

In one implementation of this invention as shown in FIG. 1, the server 11 is modified by the addition of an immunization system 30 shown for purposes of discussion as being resident in the server RAM 16 and server storage 15. The immunization system 30 includes an operating system 31 and a router 32. The router 32 performs the function of the prior art router and handles all communications between the Internet 12 and the each of the recipients 13 (1) through 13(N). With this connection, all communications to and from the Internet 12 pass through the immunization system 30.

A. General Operation

Figure 2:
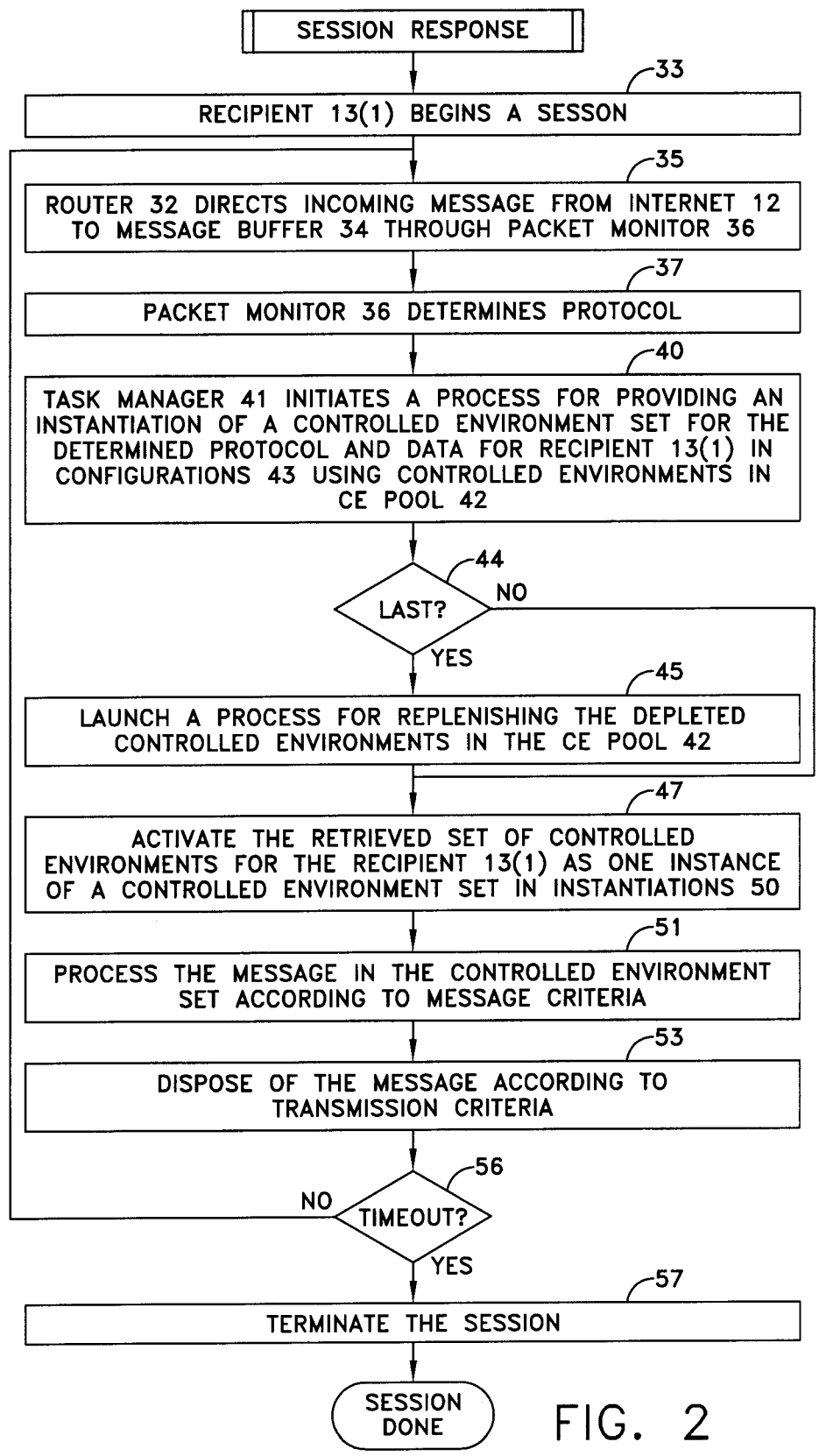
FIG. 2 is a flow chart that presents an overview of the operation of this invention.

FIG. 2 is a flow chart that depicts the general operation of the immunization system 30. Specific implementations, particularly with respect to browser and e-mail applications, are described later.

It is assumed that Internet connections take the form of a session for each Internet protocol. An individual recipient begins a session for a specific Internet protocol at step 33 by any of a variety of Internet-application dependent procedures. For example, the recipient 13(1) may generate an Internet browser session by transmitting an HTTP data packet from the Internet browser 21. A request for receiving e-mail, as from the e-mail application 22, whether performed automatically or manually, can initiate an e-mail session. The VoIP application 23 or the IM application 24 initiates a session when an appropriate VoIP or IM protocol data packet is sent or received.

Referring now to FIGS. 1 and 2, during a session an incoming message in the form of one or more data packets will be received from the Internet 12. The router 32 transfers each incoming message into a message buffer 34 as shown in step 35 of FIG. 2. A packet monitor 36 determines the protocol of the message, the receipt of the message and other message characteristics in step 37. In step 40, a task manager 41 initiates a process for providing a controlled environment set for the determined protocol from a CE pool 42. This selection is also based on configuration data about the recipient 13(1) in a configurations file 43. Specific examples are shown later. It is important to understand that the selection of a particular set of controlled environment set is determined by both the protocol and the recipient's configuration. Also, each controlled environment set is isolated from both the recipient and other portions of the server 11. For example, a virtual machine can implement each controlled environment set so each controlled environment set is isolated from and independent of the recipient's computer system.

After the task manager 41 retrieves a set of controlled environments, step 44 determines whether the number of any controlled environments in the CE pool has reached a predetermined value, such as 0, indicating that step 40 has retrieved a last controlled environment from the CE pool 42. If this occurs, step 45 launches a process for replenishing the corresponding controlled environment in the CE pool 42 from a template store 46, normally in the server storage 15. The template store 46 contains one template for each Internet and production application permitted to exist in the network. Each template corresponds to a specific one of the production or Internet applications, but has no correspondence to a specific recipient. As will become apparent, the CE pool 42 provides a repository for copies of the individual templates in the RAM 16 for purposes of increasing processing efficiency. Some implementations may merely obtain copies directly from the template store 46 without the use of a CE pool. Processes for monitoring and replenishing pools from templates are well known in the art.

Next step 47 activates the retrieved set of controlled environments as an instance of a controlled environment set for the recipient as one of a plurality of active sets in an instantiations group 50. Step 51 processes the message in the corresponding active controlled environment set according to message criteria. That is, the message criteria determine that the message contains any corrupting contents. In a simple example, the message criteria could determine that an incoming message was free of any corrupting contents only if the message contains no embedded or attached files. A more complex set of criteria could determine that an incoming message with an embedded or attached word processing file was free of corrupting contents only if the word processing file were free of any macros. A wide variety of criteria can be used to make this determination of message validity.

The system also includes a forwarding rule parameters file 52 that, for some protocols, define the possible dispositions for a message after processing in step 51 and constitute transmission criteria. An active set of controlled environments may also define other various transmission criteria. Generally after step 51 completes processing the message, step 53 disposes of the message according to three possible outcomes. First, the message is sent to the recipient, such as the recipient 13(1). Second, for certain protocols the message is sent to a blocked messages store 54 that can store these messages for a predetermined time as described later. In this embodiment, the blocked messages store 54 is shown in the server storage 15; it might also be located in the server RAM 16. Third, a remote access connection is established between a remote access program 55 of the recipient and the corresponding controlled environment set to enable the recipient to review, and in some situations manipulate the message or portion thereof.

In some embodiments it may be desirable to assure that an instantiation of a controlled environment set be active only while the recipient actually uses the protocol-based application. When that is desired, steps 56 and 57 represent a process that monitors activity. If session activity occurs regularly, control passes back to step 35 to await a next incoming message, an outgoing message or some other measure of session activity to initiate another interval. If there is no activity during the session interval, step 56 transfers to terminate the session thereby to inactivate the instantiation of the controlled environment set for that recipient and protocol in step 57.

As will now be apparent, incorporating the immunization system 30 of this invention operating according to the general process shown in FIG. 2 achieves the objects of this invention. For example, steps 51 and 53 in FIG. 2 use message criteria to assure that any message transferred to the recipient is free from any corrupting contents. This immunizes the recipient's computer system from the adverse effects of such corrupting messages.

Controlling the disposition of any incoming message in response to the operations of steps 51 and 53 provides a means for immunizing a recipient's computer system. For example, a message that may be corrupted may be viewed by a recipient with restricted access to some or all of the message as by remote viewing and/or message modification within the controlled environments.

A more thorough understanding of this invention can now be obtained by referring to two specific embodiments of an immunization system 30 shown in FIG. 1 and phases of operation, namely:

(1) the installation, configuration and initialization of the immunization system 30;

(2) the operation of a task dispatcher shown in FIG. 1;

(3) the operation of the immunization system 30 with respect to HTTP messages; and (4) the operation of the immunization system 30 with respect to e-mail messages.

B. Installation, Configuration and Initialization

Figure 3:
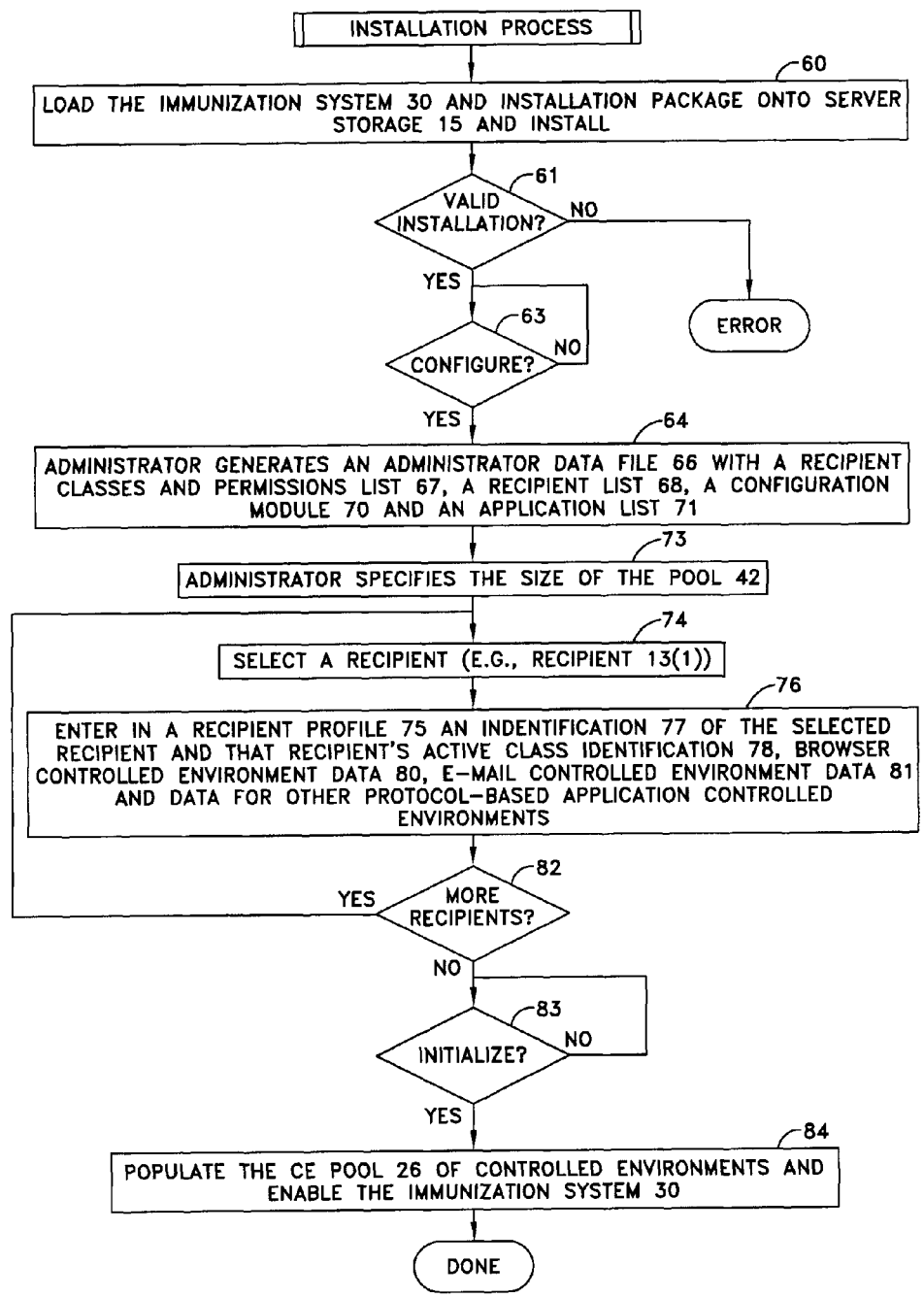
FIG. 3 is a flow diagram that depicts the installation, configuration and initialization of this invention.

FIG. 3 depicts a three-part process for installing, configuring and initializing the immunization system 30 in FIG. 1, to function according to this invention. Step 60 in FIG. 3 represents a process by which an administrator loads an executable file package to server storage 15 in FIG. 1 and then runs an installation package to install the immunization system 30 and to produce the various components shown in FIG. 1. If the installation is not valid, step 61 transfers control to step 62 that generates an error message. Normally, however, control transfers from step 61 to step 63 to allow the administrator to configure the immunization system 30. Such installation processes form no part of this invention and are well known in the art.

Figure 4:
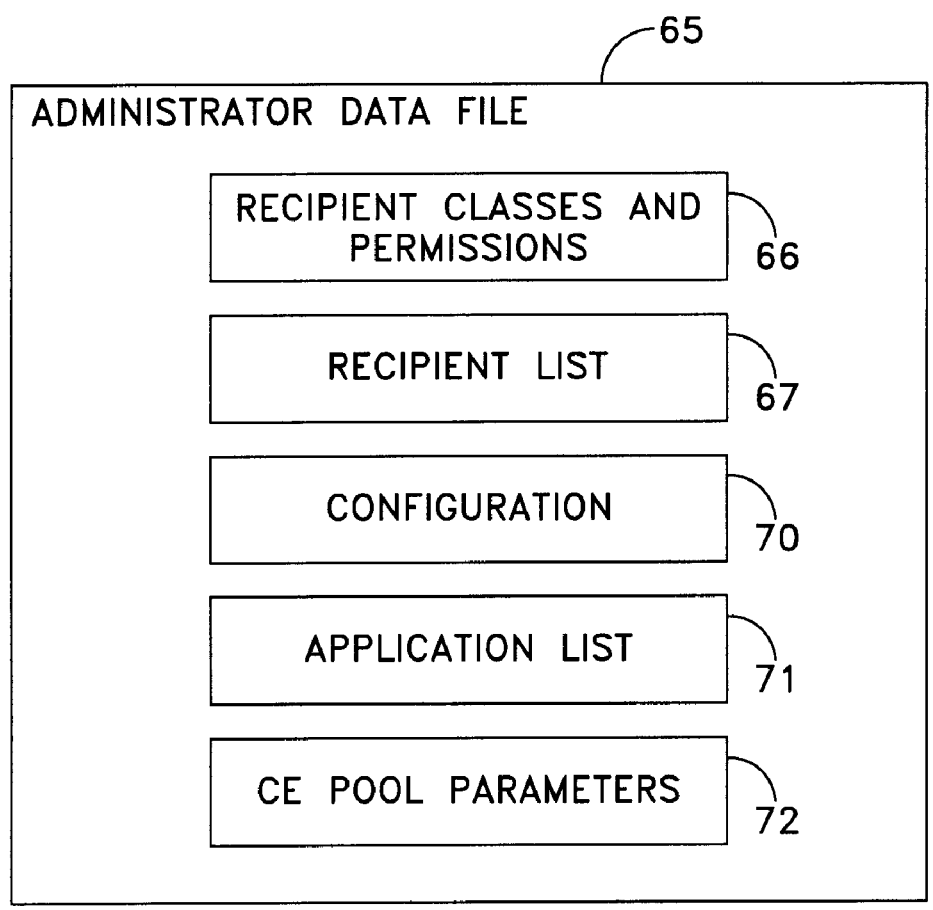
FIG. 4 is a schematic block view of an administrator data file that is useful in implementing this invention.

When the administrator is prepared to configure the system, control transfers to step 64. The configuration process requests information for generating an administrator data file 65 shown in detail in FIG. 4. Basically the administrator data file 65 is a repository for static configuration information about all recipients and applications. For example, the administrator data file 65 includes a recipient's classes and permissions file 66 that identifies each possible recipient class, the permissions associated with such a class and the recipients in each class. The administrator populates a recipient list 67 with the identification of each of the active recipients in the recipient group 13. Alternatives for maintaining this and other lists in a current state are well known in the art.

A configuration module 70 includes information concerning other static information. For example, it is possible to store blocked messages in the block messages store 54 of FIG. 1. The configuration module 70 can include the time interval that should pass before a message is deleted from the block messages store 54.

As previously indicated with respect to FIG. 1, each recipient will include a set of Internet or protocol-based applications 20 and a set of production applications 25. An application list 71 in the administrator data file 66 of FIG. 4 lists each such protocol-based and production application but without any reference to any recipient. As will be apparent, other potential applications might also be listed with active and inactive status variables assigned to each identification.

A CE pool parameters file 72 may include, for each controlled environment, the maximum and minimum numbers of copies that should reside in the CE pool 42 in FIG. 1. Step 73 requests the entry of such data.

Once this information has been added to the administrator data file 65, the administrator can enter recipient configuration information. In FIG. 3, step 74 represents the first step by selecting a recipient from the recipient list 67 in FIG. 4 and generating a recipient profile as shown, for example, in FIG. 5 by a recipient profile 75(1) for the recipient 13(1). Step 76 in FIG. 3 represents the process of populating the configuration for this recipient using other information in the administrator data file 65 of FIG. 4.

Figure 5:
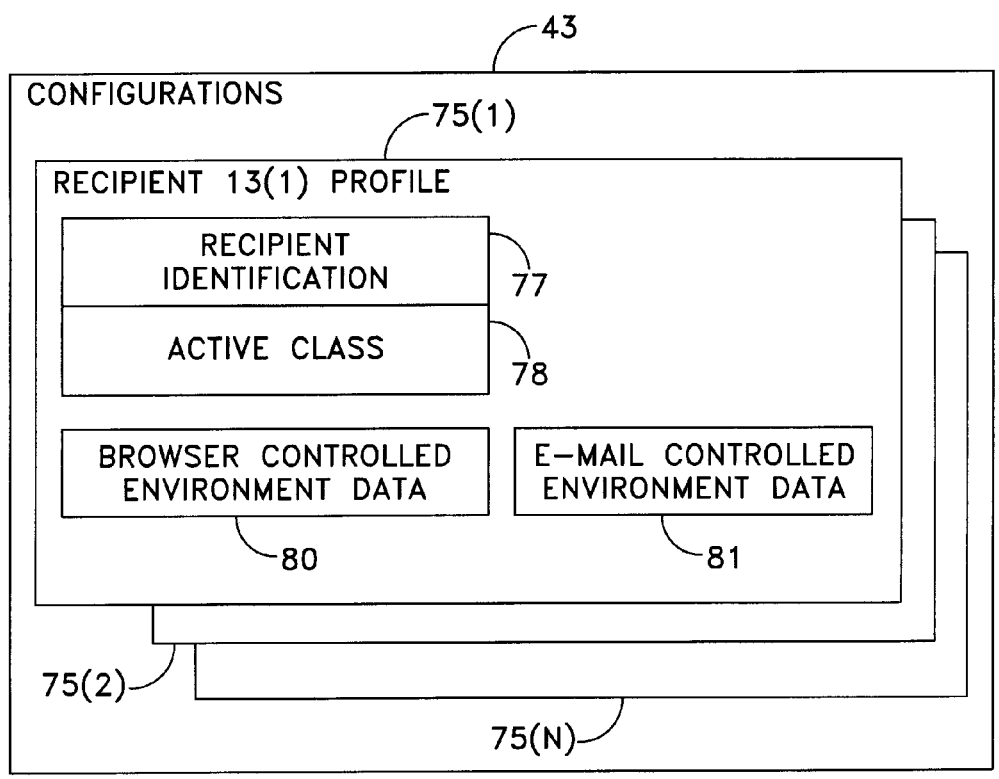
FIG. 5 is a schematic block view of configuration files shown in FIG. 1 and generated during configuration phase of the operations shown in FIG. 3.

More specifically, step 76 stores the selected recipient's identification in a recipient identification field 77 for the recipient profile 75(1) in FIG. 5. A given recipient may be assigned to multiple classes. The recipient defines one of those classes on logging in. That class is listed in an active class field 78.

Various components of browser controlled environment data are stored in a file 80. Another file 81 receives information concerning e-mail controlled environment data. The specific details of the files 80 and 81 are described later. There will be one such environment data file for each protocol-based application available to the recipient. The process by which an administrator enters in that information will be apparent to those of ordinary skill in the art.

From FIGS. 3 and 5 it also will be apparent that additional recipient profiles, can be produced. Step 82 in FIG. 3 allows the administrator either to enter more recipient data by transferring control back to step 74 or to terminate the entry of recipient configuration by transferring to step 83.

Steps 64 and 76 have been described in terms of a procedure that is integral with the installation and configuration of the immunization system 30 of FIG. 1. It will also be apparent that profiles can be added, deleted or modified using known procedures typical to server applications. Further, in such a situation a step corresponding to step 82 could merely terminate any further operations once all the recipient's have been entered or modified.

During the process shown in FIG. 3, step 83 allows the administrator to elect to initialize the immunization system 30. Essentially, step 83 represents a wait loop that continues until the administrator elects to start the immunization system 30. It will also be obvious that this might be an independent process. In any event, step 84 uses the information in the template store 46 and the CE pool parameters file 72 to populate the CE pool 42 with controlled environments. As will be apparent, each controlled environment in the CE pool 42 will be directly related to a particular application, but not to any recipient. They are therefore unassigned to a recipient and considered to be inactive. Once the CE pool 42 is populated, step 84 performs such other known processes as are necessary to enable the activation of the immunization system 30. Upon being activate, the immunization system 30 uses the router 32 in FIG. 1 to direct all incoming messages from the Internet 12 to the message buffer 34 through the packet monitor 36.

C. Task Dispatcher Operation

When step 84 in FIG. 3 enables the immunization system 30 of FIG. 1 the packet monitor 36 monitors each message sent to or received from the Internet 12. After processing an incoming or outgoing message, the packet monitor 36 passes information about the message protocol, addresses and message content to the task dispatcher 41 that responds by means of a process control 90 in FIG. 6.

Figure 6:
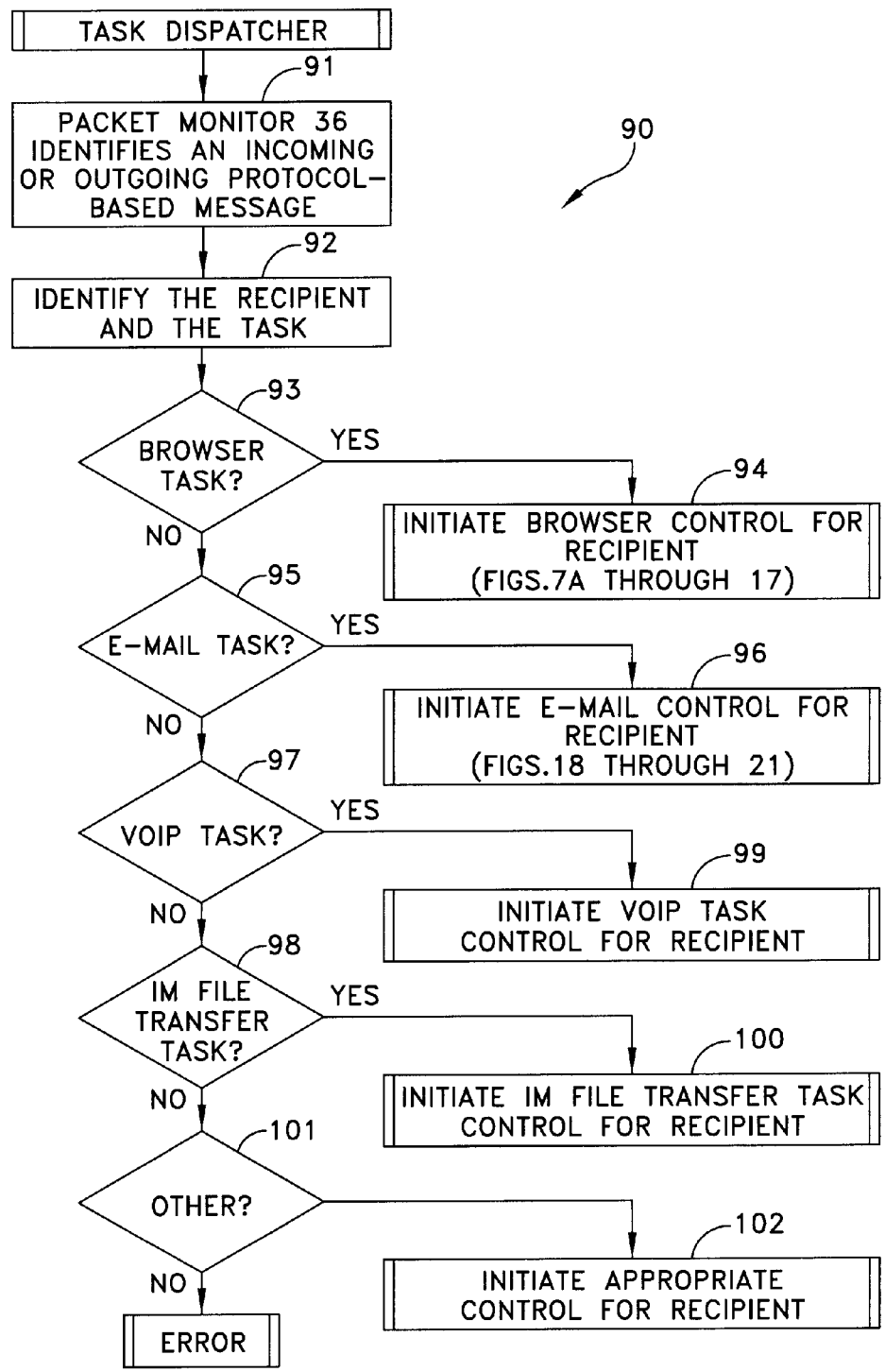
FIG. 6 is a flow diagram of one embodiment of a task dispatcher shown in FIG. 1.

More specifically, when the packet monitor 36 identifies an incoming or outgoing protocol-based message, as represented by step 91 in FIG. 6, the task dispatcher 41 uses step 92 to identify the recipient and message protocol. If step 92 identifies the message as relating to a browser message, step 93 calls process 94 to initiate the browser control for the recipient as outlined in FIGS. 7A through 17. If an e-mail message is detected, step 95 calls process 96 to initiate an e-mail control for the recipient as disclosed in FIG. 18 through 21. If the message is characterized as a VoIP or IM protocol, step 97 or step 98 will call corresponding one of the processes 99 and 100, respectively. Step 101 enables a process 102 in response to other protocols. If no task is defined, an error condition exists; so the task terminates.

Controls for VoIP, IM and other protocols will incorporate many of the features of the browser and e-mail protocol controls. The adaptation of such features to these other protocols will be apparent to those of ordinary skill in the art.

D. Browser Control Operation

The implementation of the process generally depicted in FIG. 2 can be more readily understood by describing in greater detail the operation of the immunization system 30 of FIG. 1 in accordance with this invention with respect to communications between a recipient's browser 21 and a destination website. The particular example selected for the purposes of this description comprises a session including (1) the initiation of a browser operation by entering a website address at the recipient 13(1), (2) the receipt of a web page that includes a link to a spreadsheet and (3) a request by the recipient 13(1) to download that spreadsheet.

(1) Browser Operation—Website Address Entered

When the recipient 13(1) initiates a session with a website, the Internet browser 21 generates an HTTP data packet that includes the recipient's address, the website address and the recipient's browser among other information. This data packet passes through the router 32. When the packet monitor 36 identifies this data packet as a browser data packet, step 93 in FIG. 6 transfers control to initiate a browser control process 94 for the recipient of FIGS. 7A and 7B.

Figure 7A:
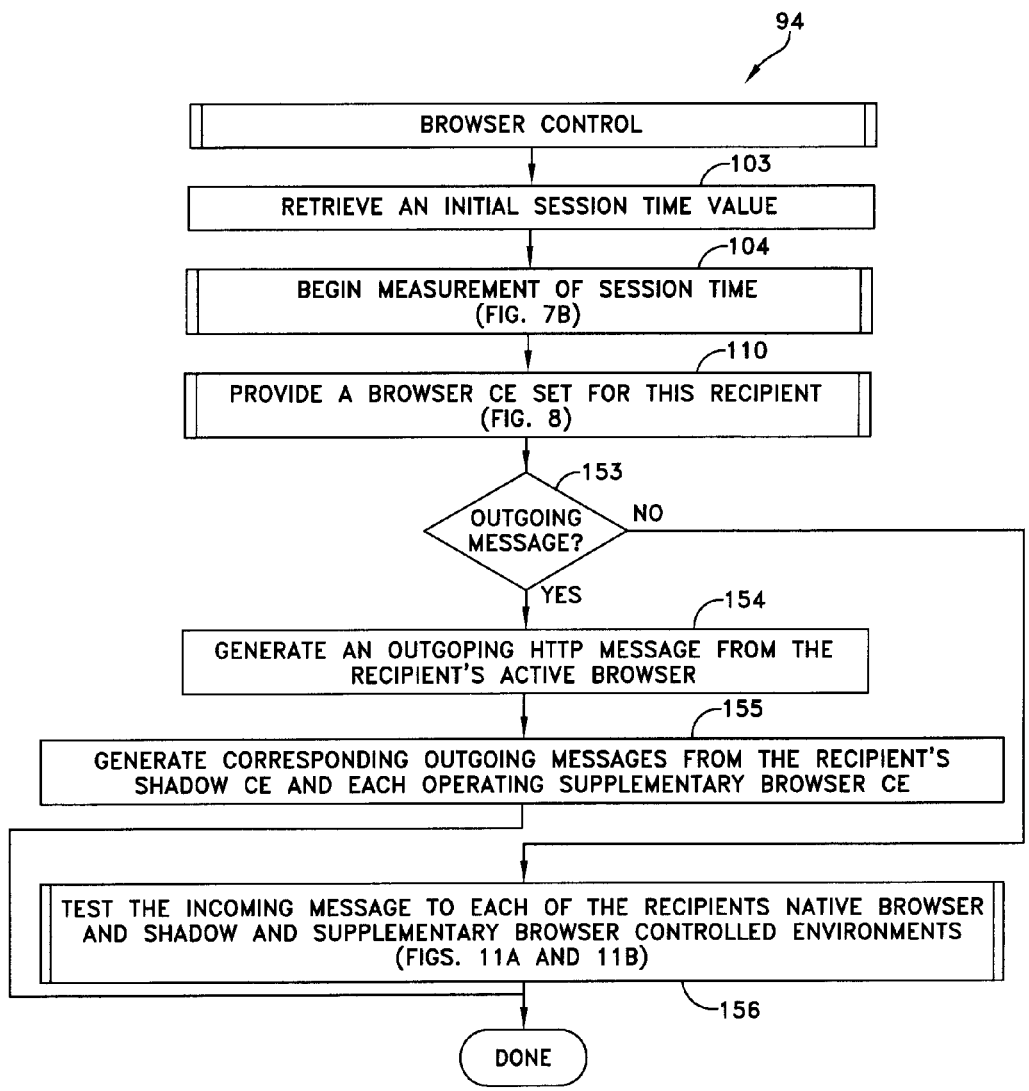
FIGS. 7A and 7B constitute a flow diagram that generally depicts a process by which all incoming HTTP messages are processed.
Figure 7B:
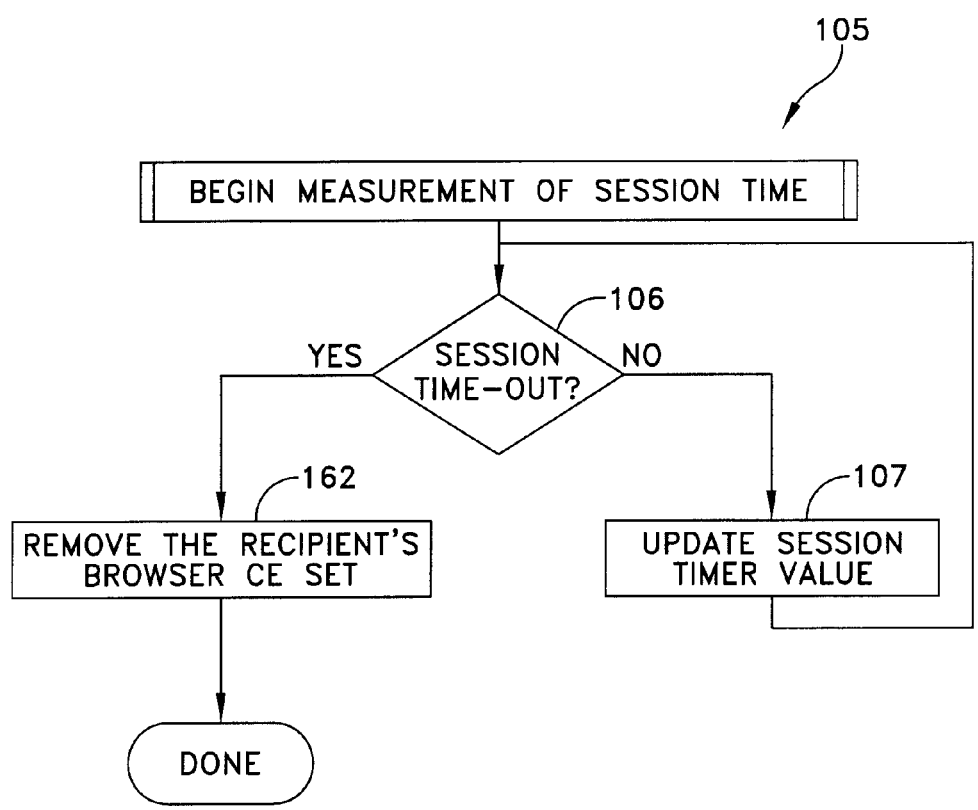

If a session time-out is implemented, step 103 in FIG. 7A retrieves a session time value. Typically such a value will be in terms of hours. Process 104 then uses this value to begin an asynchronous session time out 105 as shown in FIG. 7B. Specifically, step 106 monitors a counter for a specific value that indicates that the interval has elapsed. If it has not, step 106 transfers control to step 107 to increment or decrement the value in the timer. As this is a first outgoing transmission, the session interval will not have lapsed so control passes to process 110 in FIG. 7A.

Figure 8:
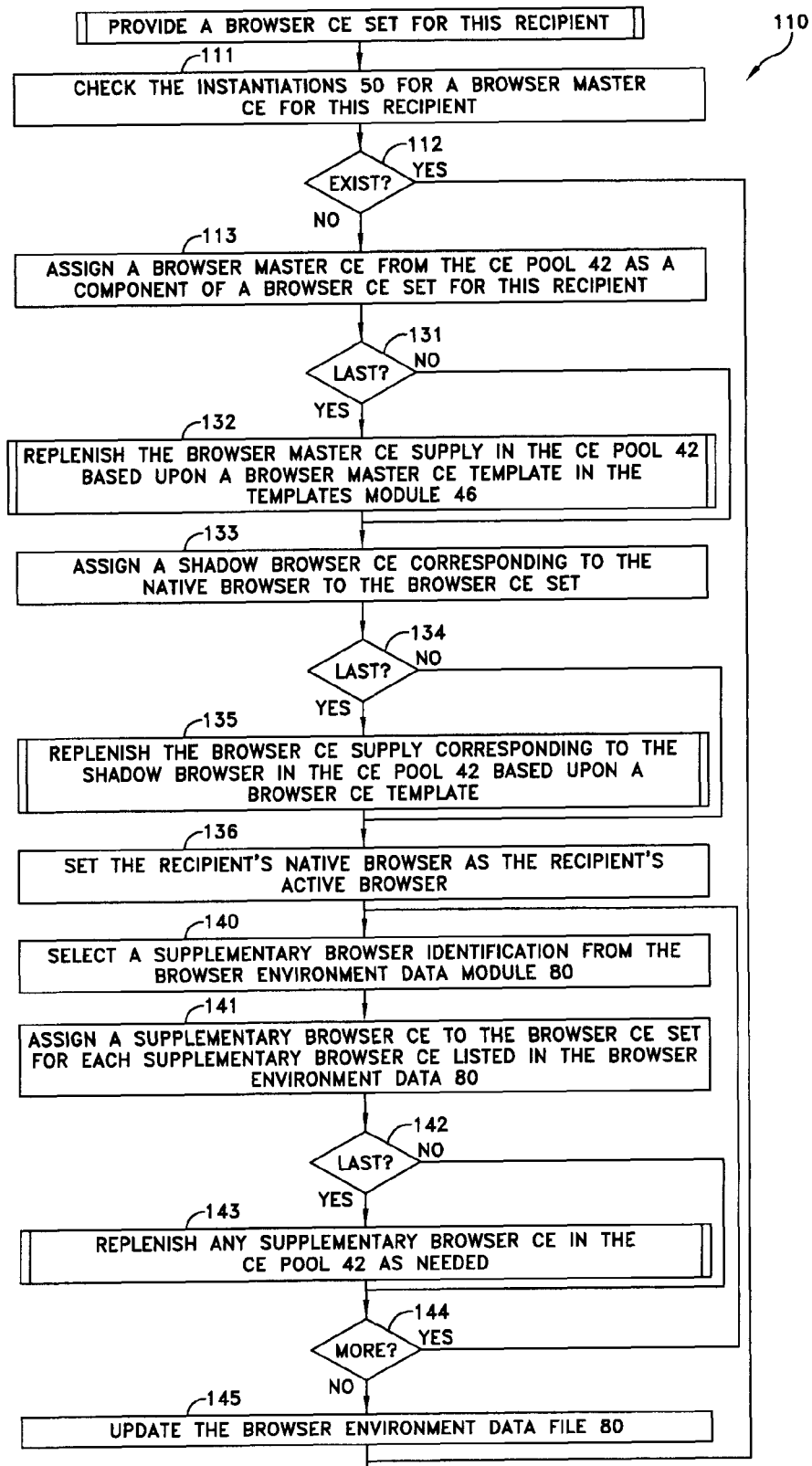
FIG. 8 constitutes a flow diagram of a process for providing a browser controlled environment set for a recipient as utilized in FIG. 7.

Process 110 provides a browser controlled environment set (hereinafter a "browser CE set") for this browser and recipient as shown in FIG. 8. Step 111 checks the instantiations group 50 in FIG. 1 to ascertain the existence of an active master browser controlled environment (hereinafter a "browser master CE") for this browser and recipient. As an example, assume that the recipient is initiating a session, no such browser master CE exists. Step 112 transfers control to step 113 that assigns a browser master CE in the CE pool 42 to the recipient to begin the construction of a browser CE set for this recipient and browser as a member of the instantiations group 50.

Figure 9:
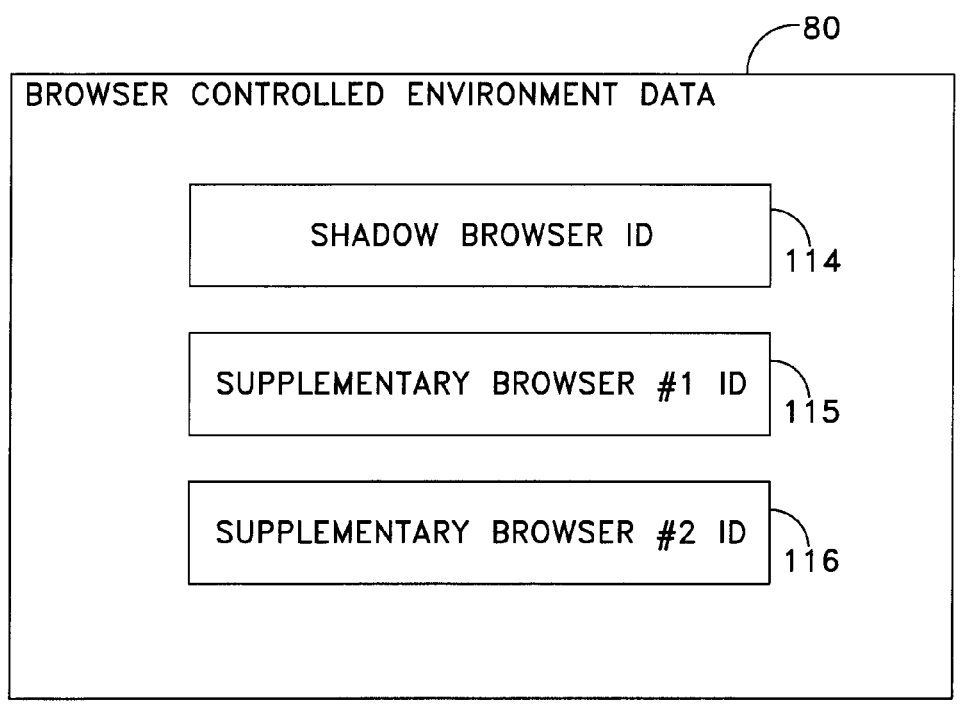
FIG. 9 is a more detailed block diagram of a browser controlled environment data file shown in FIG. 5.

FIG. 9 depicts the browser controlled environment data file 80 of FIG. 5 in greater detail. For this file 80, it is assumed that the administrator data file 65 identifies a shadow browser CE 114, a first supplementary browser CE 115 and a second supplementary browser CE 116. The shadow browser ID 114 identifies a browser CE that is analogous to the recipient's browser 21 which, in the following discussion, is designated as a "native" browser. The supplementary browser CE identifications at 115 and 116 correspond to different browsers. For example, if the native browser is a Mozilla browser, the shadow browser ID will point to a controlled environment that is functionally equivalent to the Mozilla browser. That is, the shadow browser may comprise an exact copy of the Mozilla browser or some modified or abridged version thereof. Each of the supplementary browser CEs identified by pointers 115 and 116 could include an Opera and Netscape browser CE or functional equivalent thereof.

Figure 10:
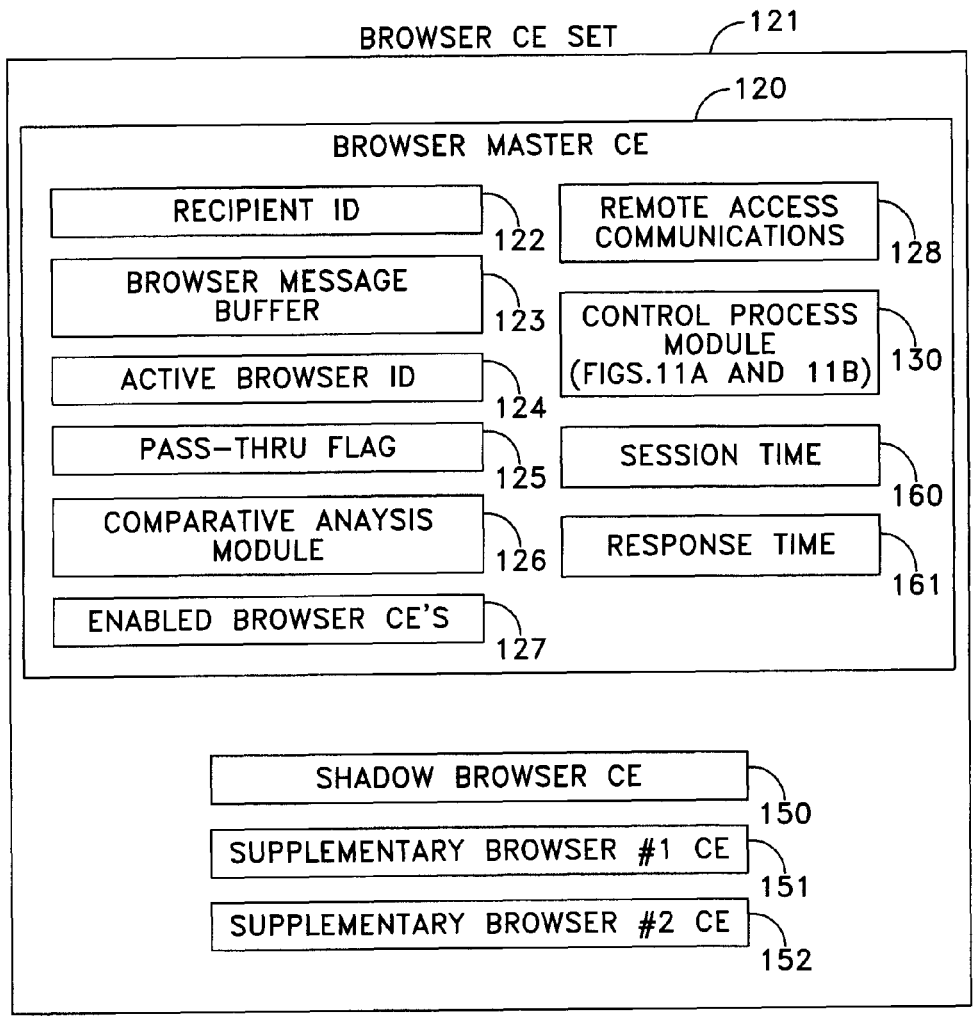
FIG. 10 is a block diagram representing an initial browser controlled environment set generated for a particular recipient using the information in FIG. 9.

Step 113 in FIG. 8 utilizes this information and other information in the recipient 13(1) profile 75(1) in FIG. 3 to generate a browser master CE 120 in FIG. 10 as a component in a browser master set 121. The browser master CE 120 is derived from a browser master CE template obtained from the template store 46. The template and corresponding browser master CE 120 contain a recipient ID field 122. A browser message buffer 123 receives any incoming HTTP message. An active browser ID field 124 identifies which of the native and shadow browsers is currently an active browser. Initially the active browser ID field 124 identifies the recipient's native browser 21. A pass-thru flag 125 provides a control function related to transmission criteria. A comparative analysis module 126 can be used in circumstances during the testing of any incoming HTTP protocol messages as described later. An enabled browser CE list 127 identifies each enabled or active browser CE. A remote access communications module 128 enables communications between the browser CE set 121 and remote access program 55 in FIG. 1. A control process module 130 controls all of the operations of the browser master CE 120 as described in more detail later with respect to FIGS. 11A and 11B.

Concurrently with, or in series with this process, step 131 in FIG. 8 determines if the number of browser master CE's has reached a minimum, e.g., 0. In this embodiment step 113 determines whether a last browser master CE in the CE pool 42 has been assigned. If it has, a parallel process 132 uses a corresponding template from the template store 46 to replenish the browser master CEs to the maximum number as defined by data in the CE pool parameters list 72 in FIG. 4.

Step 133 assigns a shadow browser CE in the CE pool 42 to the recipient. This shadow browser, as previously indicated, corresponds to the native browser. Step 134, like step 131, determines if the last corresponding browser CE in the CE pool 42 has been retrieved. If it has, step 135 replenishes the CE pool 42 from the template store 46 in FIG. 1 with one or more copies of this browser's controlled environment as determined by the information in the CE pool parameters file 72 of FIG. 4. Step 136 in FIG. 8 then enters the information about the recipient's native browser in the active browser ID 124 of FIG. 10 thereby setting the recipient's native browser as the active browser.

In this particular example, the browser controlled environment data file 80 in FIG. 9 identifies two supplementary browsers. Steps 140 through 143 represent the process for selecting a supplementary browser CE as identified in the browser controlled environment data file 80, assigning that supplementary browser CE to the browser CE set 121 for the recipient, and replenishing the CE pool 42 as needed. When this process is complete, step 144 determines whether any additional supplementary browser CE must be incorporated in the browser CE set 121. After each supplementary browser CE has been added, step 145 updates the browser environment data file 80. Now the browser CE set 121 in FIG. 10 will include the shadow browser CE 150, the supplementary browser #1 CE 151 and the supplementary browser #2 CE 152.

Control returns to step 153 in FIG. 7A to determine whether the HTTP message is an outgoing message. In this example, it is; so step 153 directs control to step 154 whereby the recipient's native browser transmits the HTTP message onto the Internet. In step 155 the browser master CE 120 causes each of the shadow browser CE 150, the first supplementary browser CE 151 and second supplementary browser CE 152 to generate corresponding messages onto the Internet with corresponding return addresses. That is, this invention causes a plurality of messages to be sent to the same website. Each message is identical except for the address of the native and each browser CE.

(2) Receipt of Web Page

If the packet monitor 36 in FIG. 1 determines that a message is received from the website, step 153 in FIG. 7A transfers control to process 156 to determine whether that incoming message is free of any corrupting contents.

During the configuration step 76 in FIG. 3, the administrator assigns two time values. The first is the session time stored in session time field 160 in FIG. 10. The second is a response time stored in a response time field 161. The value in the response time field 161 will generally be measured in seconds. This value may be derived from configuration file 70 or may be modified by the administrator. As will now be apparent, if a long time lapses between successive incoming and/or outgoing messages, the time represented by the value in the session time field 160 will expire. In that case, step 106 in FIG. 7B branches to step 162 and terminates the session by deactivating the browser CE set 121 in FIG. 10.

Figure 11A:
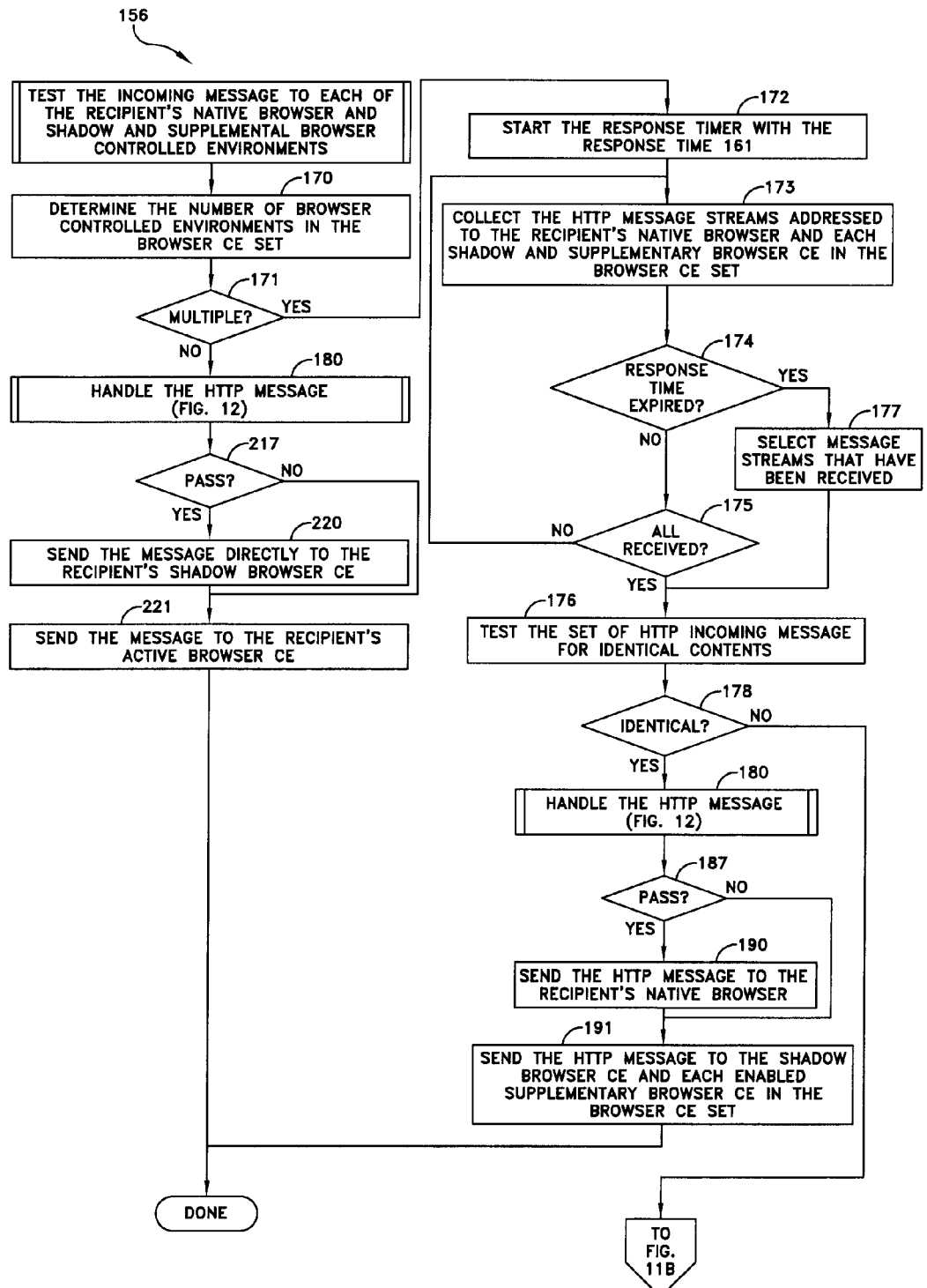
FIGS. 11A and 11B constitute a flow diagram of a process for testing incoming HTTP messages as initiated in FIG. 7A.
Figure 11B:
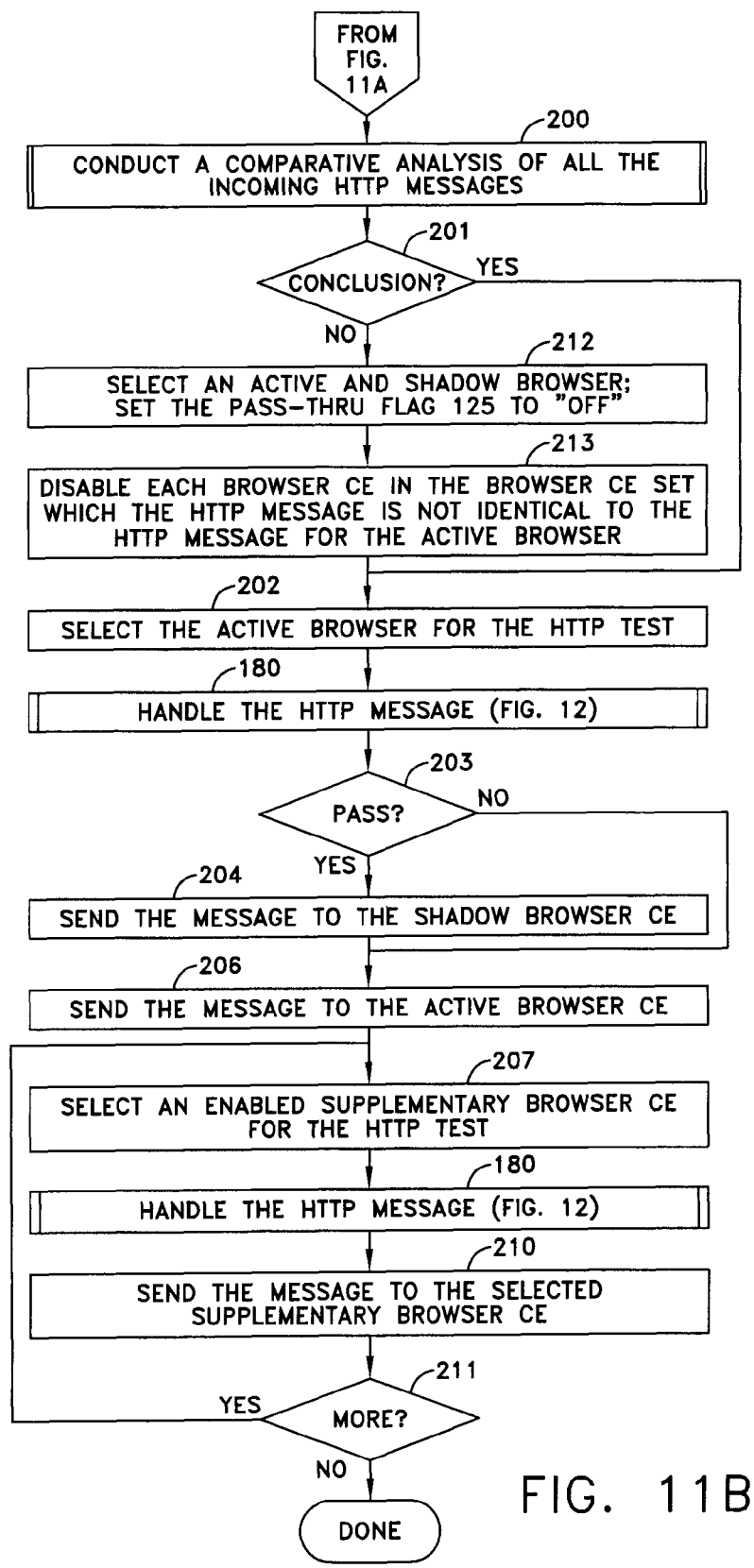

The control process 130 of FIGS. 10, 11A and 11B handle that incoming message to the recipient by processing the message in the browser CE set 121 in FIG. 10 that is assigned to the native browser and the recipient. As steps 154 and 155 in FIG. 7A transmitted multiple messages to the same websites, the server receives multiple return messages directed to the native browser, the shadow browser CE and each supplementary browser CE. In this specific example four messages should be received.

In response to a first set of outgoing messages in this particular example, step 170 in FIG. 11A determines that multiple controlled environments, namely the first supplementary browser CE 151 and the second supplementary browser CE 152, are assigned to the recipient 13(1). Therefore, step 171 transfers to step 172 to load and start a response timer with the value in the response time field 161 in FIG. 10. This establishes an interval during which all the return messages should be collected in the browser message buffer 123 as represented by step 173. Assuming all the messages are received before the response timer expires, steps 174 and 175 transfer control to step 176. Otherwise step 174 transfers control to step 177 so the process proceeds with those messages that have been received.

Step 176 represents one message criteria that requires all the HTTP incoming messages to be identical. If they are all identical the message may be free of corrupting contents. In that case, step 178 transfers control to a process 180 shown in FIG. 12 for handling one of the messages.

Figure 12:
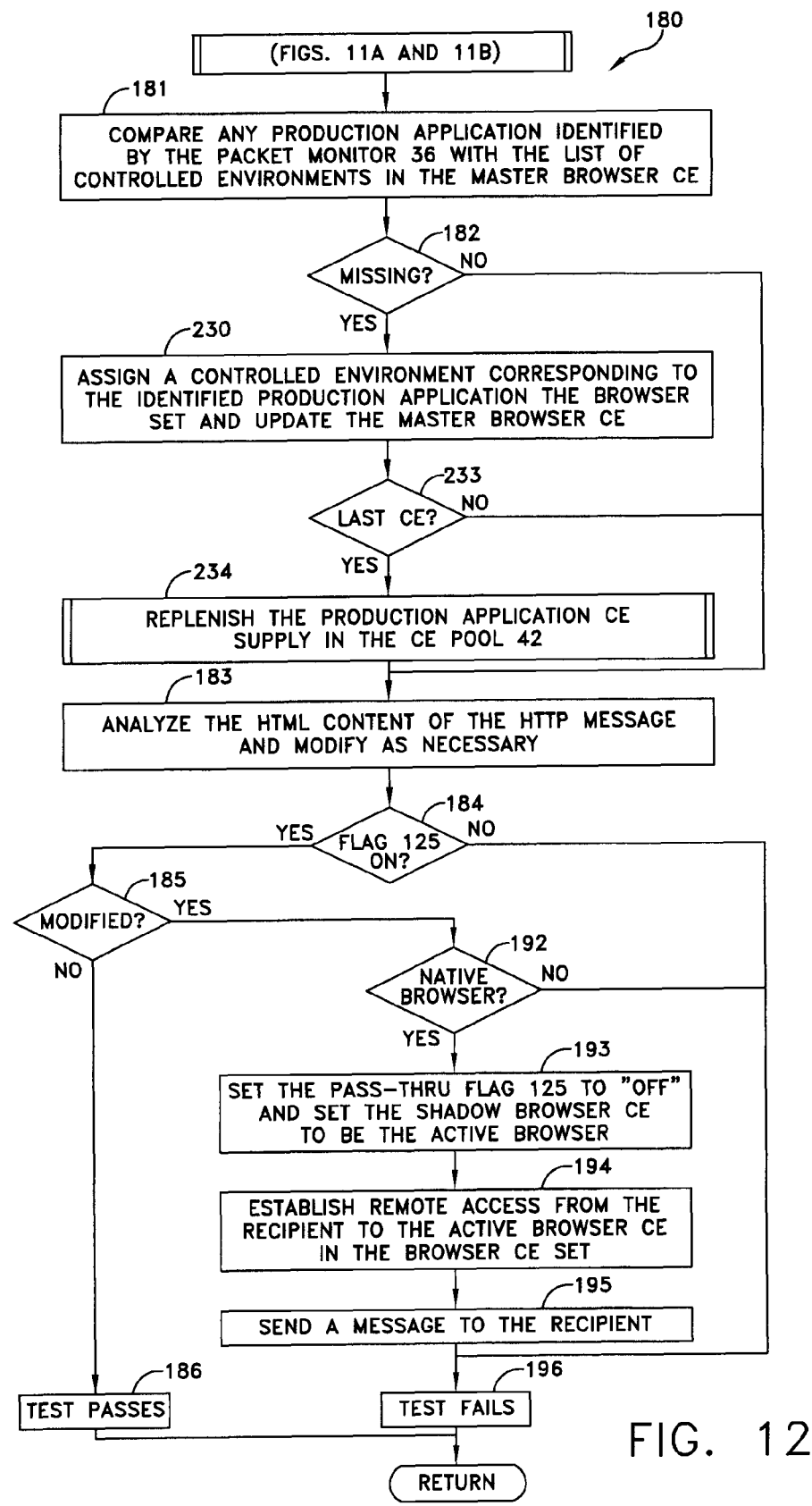
FIG. 12 is a block diagram of a process used in FIGS. 11A and 11B for handling received HTTP messages.
Figure 13:
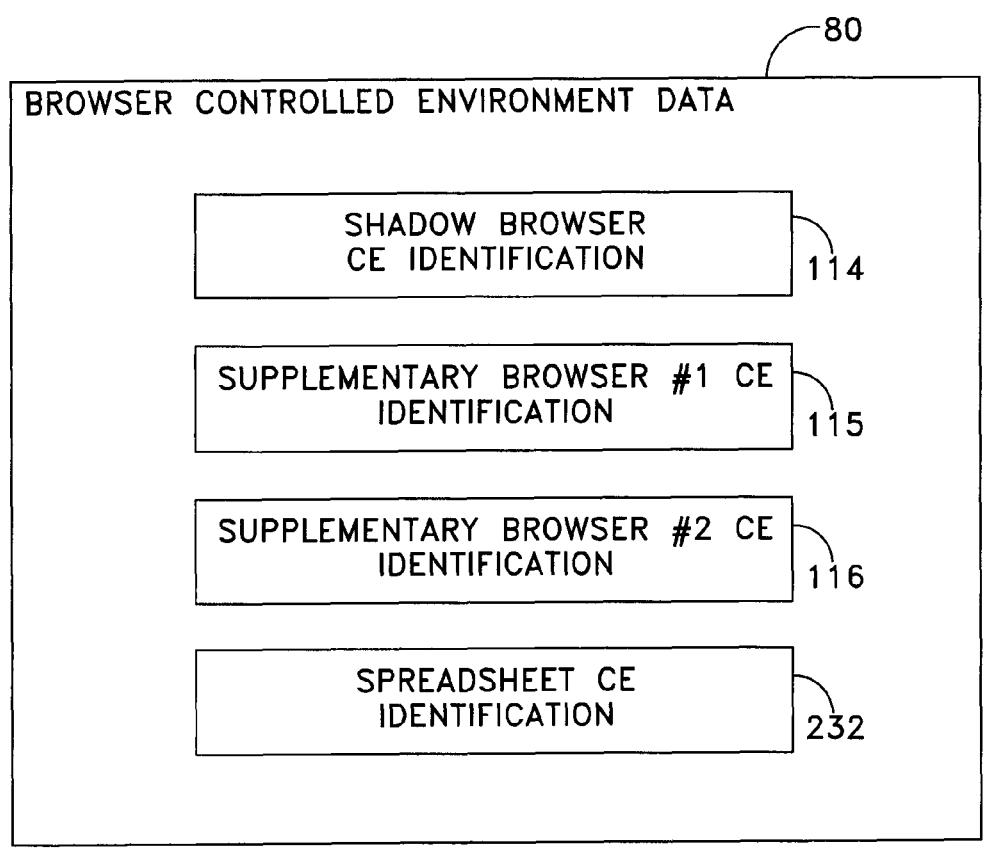
FIG. 13 is a block diagram of the browser controlled environment data file in FIG. 9 after modification in accordance with certain processing shown in FIG. 12.

Referring to FIG. 12, step 181 assures that the browser CE set 120 is complete. Specifically, step 181 determines whether the incoming HTTP message contains a file or document that requires operation of a production application, such as one of the production applications 25 in FIG. 1. In this specific example, this initial message merely contains data for a webpage, so step 182 transfers control to step 183.

Step 183 analyzes the HTML content of the HTTP message according to any of a number of message criteria and performs any necessary modifications. For example, step 183 could detect a direct reference to a disk path, such as "c:\ . . . ." In this situation it may be desirable to modify the HTML string by replacing the disk path with a null string. As another example, modification may be made if the incoming message includes a Java script subroutine that can not be shown to be safe. Often two HTTP messages may have different content because one of the browsers associated with the browser CE set 121 is a newer version of another browser. In this situation it might be required to modify the HTML string to improve display. These and other situations can be analyzed by known techniques. If such a modification occurs, then, while the incoming message may be safe, it is, nevertheless, designated to be a modified message.

Step 184 then determines whether the pass-thru flag 125 in FIG. 10 is on. Assuming that this message has not been modified previously, step 184 transfers to step 185. If step 183 has not modified the content of the HTTP message, step 185 transfers control to step 186 to indicate that the test has been passed. That is, the message criteria that define a message as valid by requiring identical messages with no modification have been met. If any of these message criteria are not met, the message is deemed suspicious and requires special handling, even though it may be safe.

With a safe message, step 187 in FIG. 11A transfers control to step 190 that sends the HTTP message to the recipient's native browser e.g., the Internet browser 21 in FIG. 1. In addition, step 191 replicates the message to each of the shadow browser CE 150, the enabled first supplementary browser CE 151 and the second supplementary browser CE 152 in FIG. 10 to maintain synchronism with the native browser 21 in FIG. 1. In this example, each browser CE is enabled.

If step 183 in FIG. 12 were to modify the message for any reason, step 185 would transfer control to step 192 to determine if the message was directed to the native browser. Assuming that the message is directed to the native browser, step 193 sets the pass-thru flag 125 to an "off" state. In addition step 193 sets the shadow browser CE to be the active browser. Step 194 then initiates remote access between the recipient and the recipient's browser controlled environment set, particularly the active browser, now the shadow browser CE by interconnecting the remote access program 55 in FIG. 1 with the remote access communications module 128 in FIG. 10 and corresponding remote access communications module in the active browser CE. Step 195 then sends a message that prompts the recipient to initiate the remote access. The result is that the native browser is isolated.

Such isolation might be implemented by sending a visual message to the recipient whereupon the recipient initiates remote access manually. Remote communications could also be initiated automatically. Step 196 then represents the conclusion that the test has failed.

Whenever the test fails, step 187 in FIG. 11A bypasses step 190 and sends the HTTP message only to the recipient's shadow browser CE 150 and the enabled ones of the first supplementary browser CE 151 and the second supplementary browser CE 152. The message therefore does not transfer to the recipient's native browser 21 in FIG. 1. That is, the message, not having been proven to be valid, becomes available only remotely to the recipient. Further, as the pass-thru flag 125 has been set to an "off" state, step 184 in FIG. 12 will always force a test failure so all further communications will be by remote access.

If the process in step 176 in FIG. 11A determines that all the incoming messages are not identical, step 178 transfers control to step 200 in FIG. 11B to conduct a comparative analysis of all the incoming HTTP messages. A typical comparative analysis in step 200 could be in the form of a heuristic analysis that attempts to identify one of the different messages as a potentially valid message. Some differences among the messages directed to the native browser and to each browser CE in the browser CE set may be due to inherent characteristics of the different browsers that requested the message. There exists a set of rules and facts from which it may be concluded that one specific message is valid. Process 200 applies those rules in an attempt to designate those messages that the analysis deems to be valid. If successful, process 200 can then designate an active browser. Process 200 also can disable any supplementary browser CE that is associated with a message that is not shown to be valid. If this occurs, process 200 designates an active browser and updates the enabled browser CE list 127 to disable any browser CE associated with a non-selected message and reaches a conclusion. Each disabled browser CE remains in that state until the end of a session. Other embodiments may permit a recipient to be notified of such issues and permit the recipient to terminate an existing session, as to one destination site, and begin afresh with another destination site.

If the process 200 is able to reach a conclusion, step 201 transfers control to step 202 to select the identified active browser as a source for the HTTP message test 180. If the processing in the HTTP message handling process 180 indicates the test has passed, step 203 transfers control to step 204 thereby to send the message to the shadow browser CE 150. As previously described with respect to FIG. 12, a message can pass the test of process 180 only if the recipient's native browser is the active browser. Step 206 replicates the message to the active browser.

Next the browser control process module 130 initiates a loop to test the messages addressed to each remaining enabled supplementary browser CE in the browser CE set 121. Step 207 selects one such supplementary browser CE. The process 180 handles the corresponding message. In this situation, however, the message as presented or modified by the process 180 is sent directly to the selected supplementary browser CE by step 210 whether the process determines that the message has passed or failed the analysis. Step 211 acts as a loop control. When the last message to an enabled supplementary browser CE has been processed, the control process 130 for this message ends.

Now assume that the analysis of step 200 in FIG. 11B is unable to reach a conclusion. If the process reaches step 212, the native browser no longer is the active browser. Step 212 then selects the shadow browser CE or a supplementary browser CE to be the active browser and sets the pass-thru flag 125 to "OFF". This selection can be accomplished using any of a number of analyses. In one analysis, the administrative data file could contain rules that define an order of selection. Another analysis could use information about the recipient, prior experience with communications with websites generally or the specific website and prior experience with selections. A similar analysis would identify a shadow browser, if necessary.

Step 213 then disables each browser CE that does not have an identical message to the selected active browser message. Then process 180 handles that HTTP message. If the test passes, step 204 sends the HTTP message to the recipient's shadow browser CE and the active browser in step 206 because, as shown in FIG. 12, process 180 has tested the message from the native browser. Steps 207, 210 and 211 and process 180 process each remaining enabled browser CE as previously described. When step 211 determines no additional supplementary browser CE remains, the processing of this set of incoming messages terminates.

Under certain operation conditions only one browser controlled environment may exist. For example, the browser CE set 121 includes only a shadow browser CE. Alternatively, step 213 disables any browser CE that does not have identical HTTP messages. If, over time, all the supplemental controlled environments become disabled, only a single browser CE will exist. Step 171 in FIG. 11A responds by transferring control to the process 180 to handle the HTTP message. If the conditions of the process 180 are met, step 217 transfers control to step 220 thereby to send a message directly to the recipient's shadow browser and to the active browser CE in step 221. Otherwise, step 217 transfers the message only to the active browser CE.

(3) Retrieving the Linked File

In the example, and assuming that the incoming HTTP message is transferred to the recipient's native browser 21 in FIG. 1, the recipient now is assumed to activate the spreadsheet link. The task dispatcher 90 in FIG. 6 transfers the task to browser control 94 of FIG. 7A and loads a new session time out value for the session time field 161. The process of FIG. 8 comprising steps 111 and 112 determines that the instantiations 50 includes the master browser CE set 121, so control transfers to step 153 in FIG. 7A thereby bypassing the previously described process of forming a browser CE set for this recipient and browser. Step 153 sends the message by means of each various native browser and browser CE set to the Internet 12.

Returning or incoming messages transfer to the browser message buffer 123 in FIG. 10. The packet monitor 36 detects the message characteristics, namely the presence of a spreadsheet file within the message. Control then transfers to the process 156 in FIGS. 11A and 11B.

Figure 14:
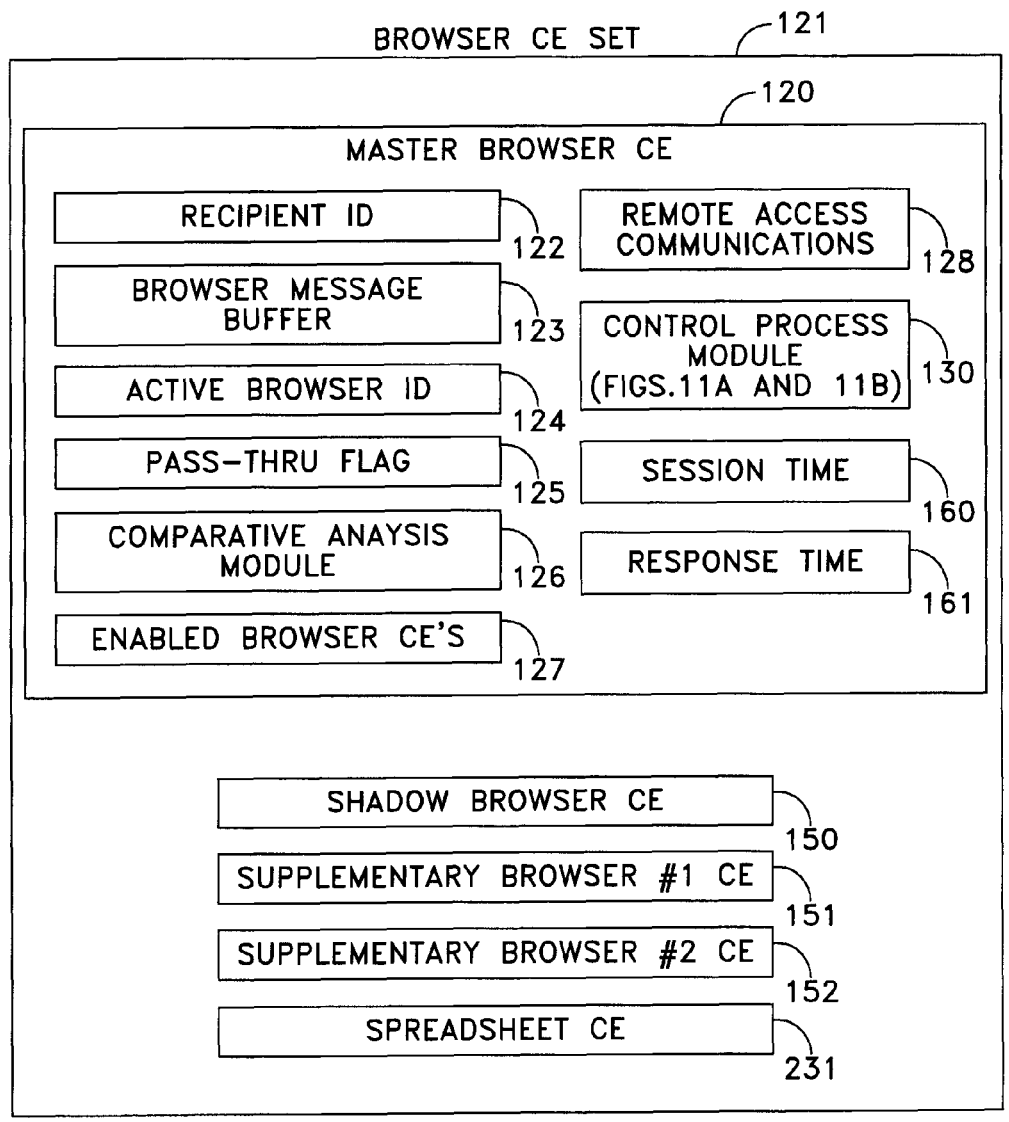
FIG. 14 is a block diagram of the browser controlled environment set of FIG. 10 after modification in accordance with certain processing shown in FIG. 12.

Assuming that the session has produced no changes, steps 170 through 177 in FIG. 11A transfer control to the process in FIG. 12. Step 182 indicates that the there is no controlled environment corresponding to the spreadsheet processor 27 in FIG. 1. Consequently step 182 transfers control to step 230 that assigns a controlled environment corresponding to that spreadsheet application to the browser CE set and updates the master browser CE 120. In this specific example, step 230 retrieves and adds a spreadsheet CE 231 to the browser CE set 121 as shown in FIG. 14. Likewise, the browser controlled environment data 80 of FIG. 9 changes by adding a spreadsheet CE identification 232 in FIG. 13. Steps 233 and 234 then monitor the number of corresponding Internet production programs available in the CE pool 42 and replenish the CE pool 42 as required.

This message is handled in FIGS. 11A and 11B in the same manner as previously described. During the message handling process 180 of FIG. 12, step 183 calls the application controlled environment, in this case the spreadsheet CE 231, to analyze the spreadsheet file. This analysis may, for example, identify and delete any macros in the file. Such an action constitutes a modification that may initiate remote access, if such remote access had not been initiated in response to the analysis of a prior incoming message during the session.

As will now be understood, the data structures and processes of FIGS. 7 through 14 provide a method and subsystem for immunizing a recipient's computer system in a data processing network from the corrupting content of an incoming protocol received over a communications path, such as from the Internet. More particularly, for the HTTP protocol the server 11 runs the immunization system 30 and a set of at least one controlled environment comprising a browser CE set 121 in FIG. 10 including a browser message buffer 123. The packet monitor 36 and task dispatcher 41 respond by transferring control to the processes of FIGS. 7 through 14. The process for handling HTTP messages 180 shown in FIG. 12 and step 200 in FIG. 11B collectively represent, with other steps, message criteria by which a message can be determined to be free of corrupting contents. For incoming browser HTTP messages, the decisions made in the process of FIGS. 11A and 11B define a set of message transmission criteria that routes controls to the disposition of the message. That is, if the message is free of corrupting contents, the message transfers to the recipient's native browser as shown by step 190 and 220 in FIG. 11A. Otherwise the message remains in a controlled environment thereby to be accessible only remotely. Thus messages that might reach the recipient in prior art systems do not reach the recipient in accordance with this invention. Moreover, even if a message may contain corrupting contents, the recipient can view the message and carry on the session while still keeping a suspicious message in isolation.

E-Mail Control

The processing of e-mail protocol messages pursuant to this invention follows the same basic philosophy as the processing of HTTP protocol messages. That is, each incoming e-mail protocol message initially transfers to an isolated controlled environment and then transfers to the recipient only if it is free of corrupting contents. Otherwise the message becomes available for viewing by the recipient remotely to a controlled environment.

More specifically, when the message buffer 34 in FIG. 1 receives an incoming e-mail message, the packet monitor 36 decodes the message as an incoming e-mail protocol message. The task dispatcher 41 responds to the output of the packet monitor 36 by initiating e-mail control for the recipient through the process 96 shown in FIGS. 6 and 15.

Figure 15:
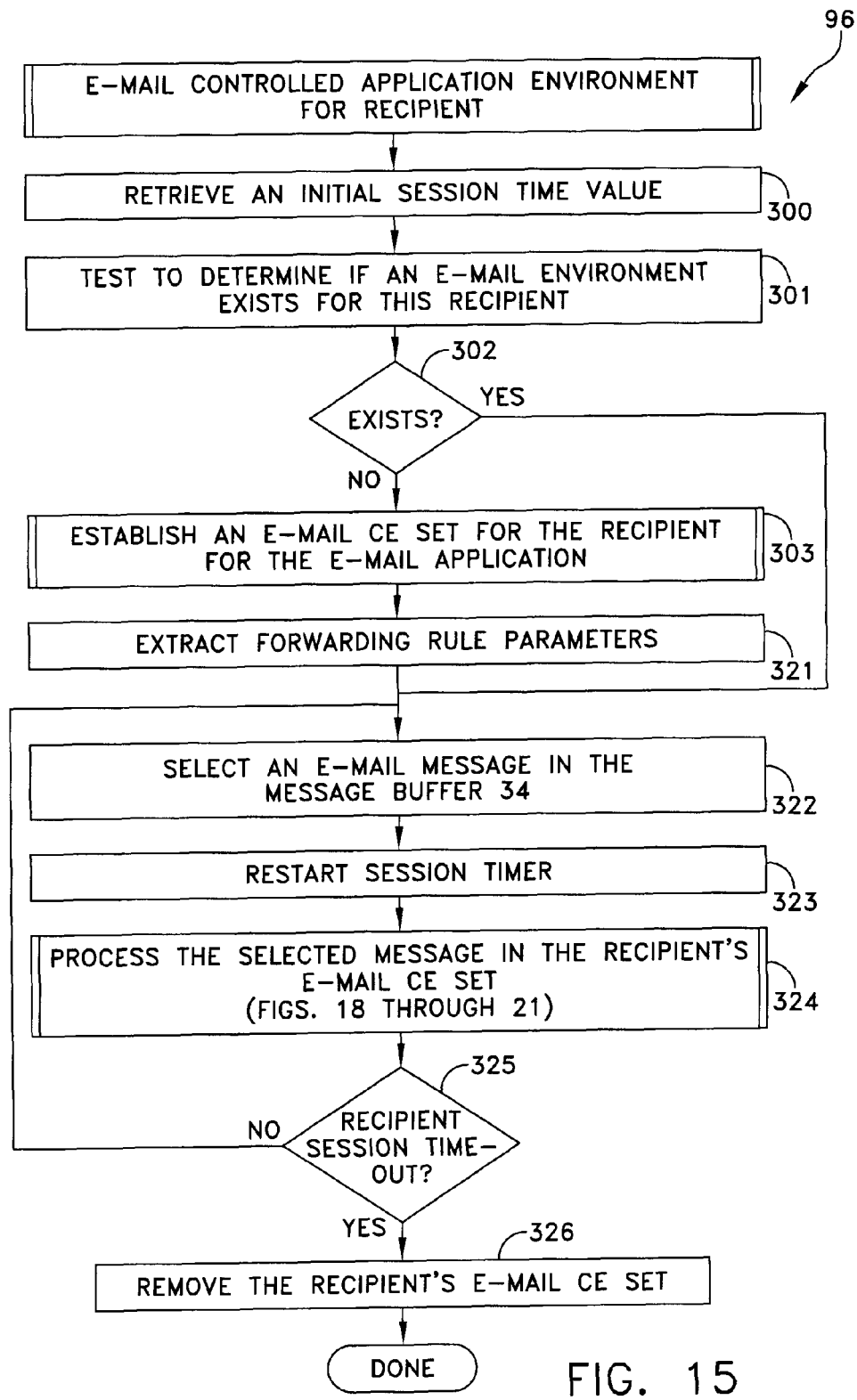
FIG. 15 is a general flow diagram of an e-mail control process.

More particularly, the server processor 14 in FIG. 1 operates according to the process of FIG. 15 by starting a session time-out interval using the value from the session time buffer like the session time-out interval for the browser control at step 300. Step 301 determines if an instantiation of e-mail environment exists for this recipient and e-mail protocol. Assume, for purposes of this discussion that a first request for e-mails is being sent during a session. No such e-mail CE set exists. Step 302 transfers control to step 303 to establish such an e-mail CE set as one of the instantiations group 50 in FIG. 1 to serve as a controlled environment for the recipient.

Figure 16:
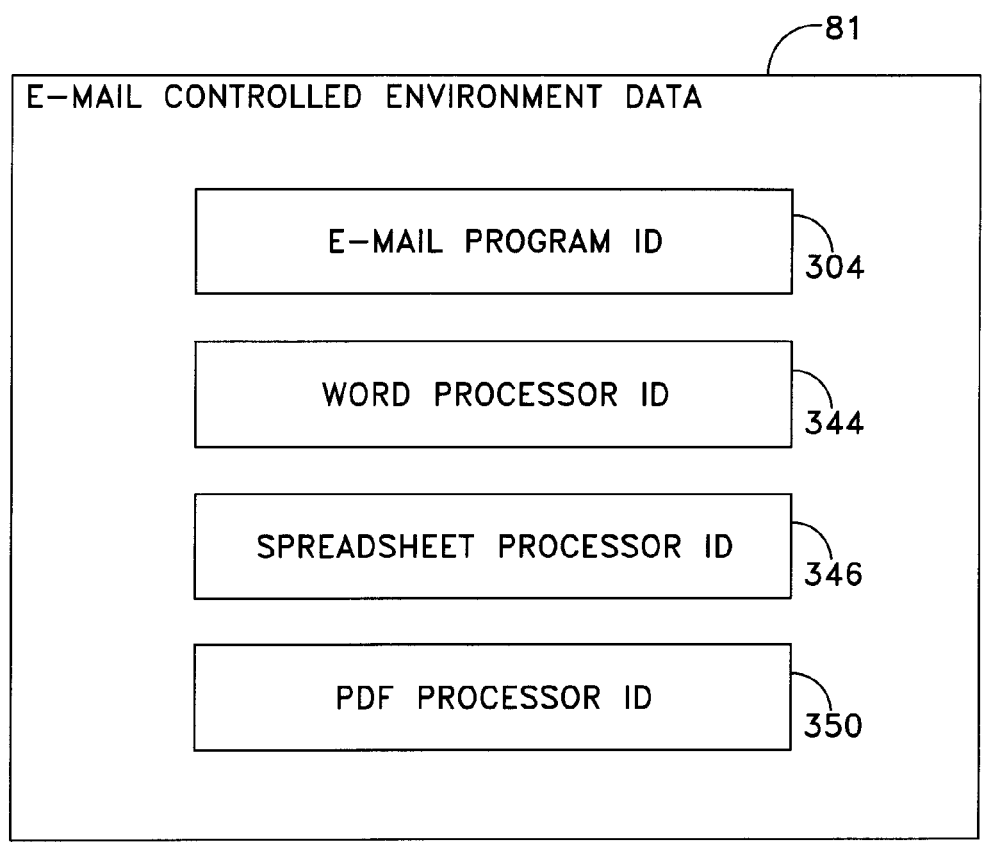
FIG. 16 is a block diagram of an e-mail controlled environment data file.
Figure 17:
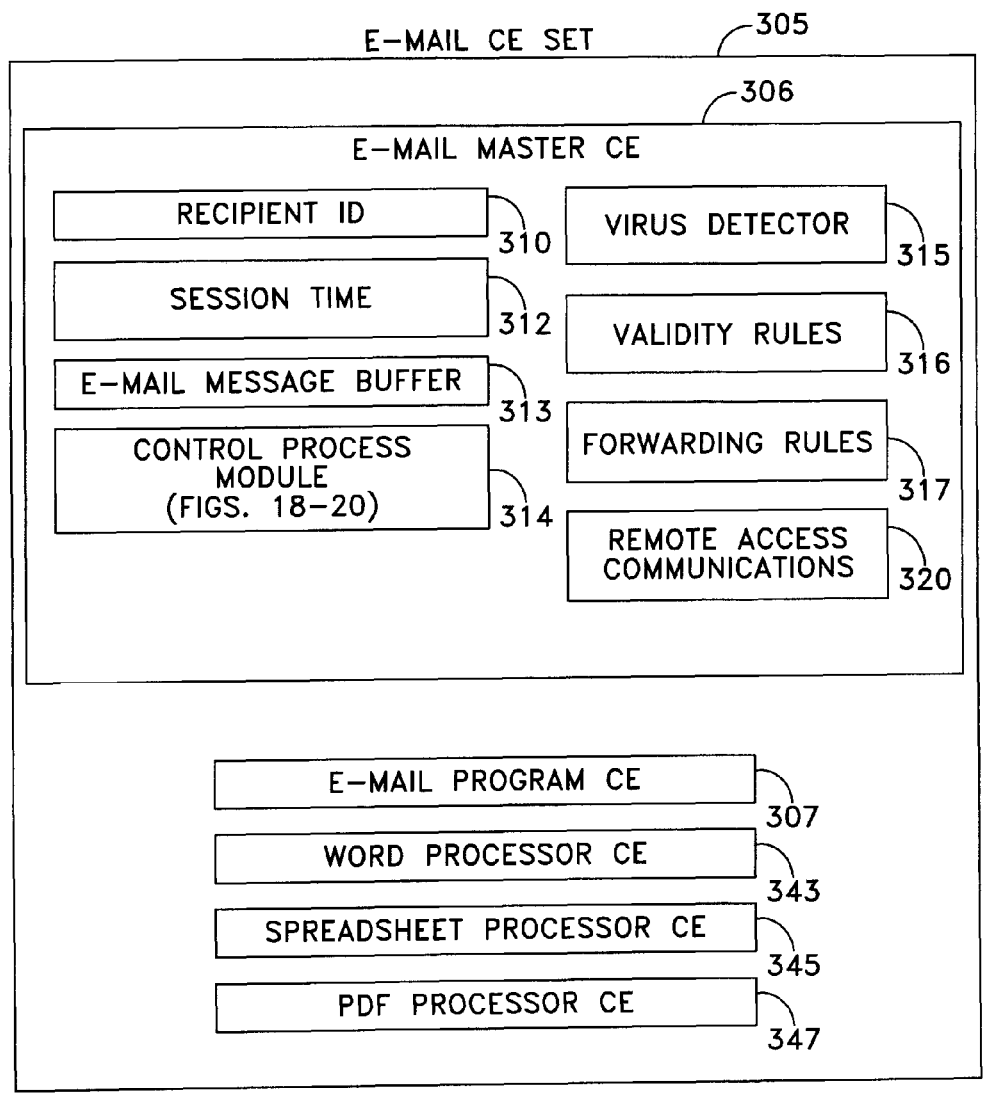
FIG. 17 is a block diagram of an e-mail controlled environment set.

The process for providing an e-mail CE set instantiation corresponds in many aspects to the process for forming a browser CE set as shown in FIG. 8. Step 302 transfers control to process 303 in FIG. 15 to establish the e-mail CE set for the recipient and the e-mail application. Process 303 is not shown in detail; however, the steps correspond to steps 113 through 135 in FIG. 8, modified to use the e-mail controlled environment data 81 of FIG. 5 and particularly shown in FIG. 16. That is, the data 81 includes an e-mail program ID field 304 for the recipient. FIG. 17 depicts the e-mail CE set 305 shown in FIG. 17. In addition, the process establishes an e-mail program CE 307 corresponding to the e-mail program protocol. Additional entries shown by dashed blocks in FIGS. 16 and 17 represent optional matters. They are described later.

The process 303 produces an e-mail master CE 306 with a recipient ID field 310 to produce a unique e-mail master CE 306 for the recipient. A session time field 312 establishes an interval of inactivity that will cause a session to terminate. An incoming e-mail message is transferred into an e-mail message buffer 313 for processing in response to a control process 314 shown in FIGS. 18 through 20. The control process 314 uses information in a virus detector 315 and validity rules 316 to determine whether the message in the e-mail message buffer 313 is free of corrupting contents. The control process module 314 uses certain ones of a set of forwarding rules 317 to control the destination of the e-mail message. A remote access communications module 320 provides a means for rendering the e-mail message for remote viewing by the recipient.

Referring again to FIG. 15, step 321 responds to the completion of the e-mail master CE 306 by extracting certain ones of the forwarding rule parameters 52 in FIG. 1 for populating the forwarding rules buffer 317 in FIG. 17. Step 322 then selects a message from the message buffer 34 in FIG. 1 for transfer to the e-mail message buffer 313 in FIG. 17. As the e-mail master CE set 305 constitutes an isolated controlled environment, all processing of the e-mail message as contained in the e-mail message buffer 313 can not impact the server 10 or the recipient 13. Step 323 retrieves the session time value from the session time field 312 to restart the session timer 312 in FIG. 17. Process 324 then processes the selected message in the recipient's e-mail CE set, such as the e-mail CE set 305 in FIG. 17. Details of this processing are described later.

Steps 325 and 326 represent a loop control for allowing steps 322 and 323 and process 324 to handle multiple e-mail messages in an orderly fashion. Step 325 represents a process for determining whether a session has timed out. That is, once all the e-mail messages in the message buffer 34 for this recipient have been processed, the session timer 312 may indicate the end of the session interval. If that occurs, control passes to step 326 to remove the instance of the e-mail CE set from the server RAM 16, particularly from the instantiations group 50. If another message exists in the message buffer 34, control returns to step 322. Likewise, if a new e-mail message is received after all the e-mail messages in the message buffer 34 have been processed and prior to the expiration of the session time-out interval, the process 96 starts again thereby restarting the session timer using the prior instantiation of the e-mail CE set, such as the e-mail CE set 305 in FIG. 17.

(1) Processing the E-Mail Message

Figure 18:
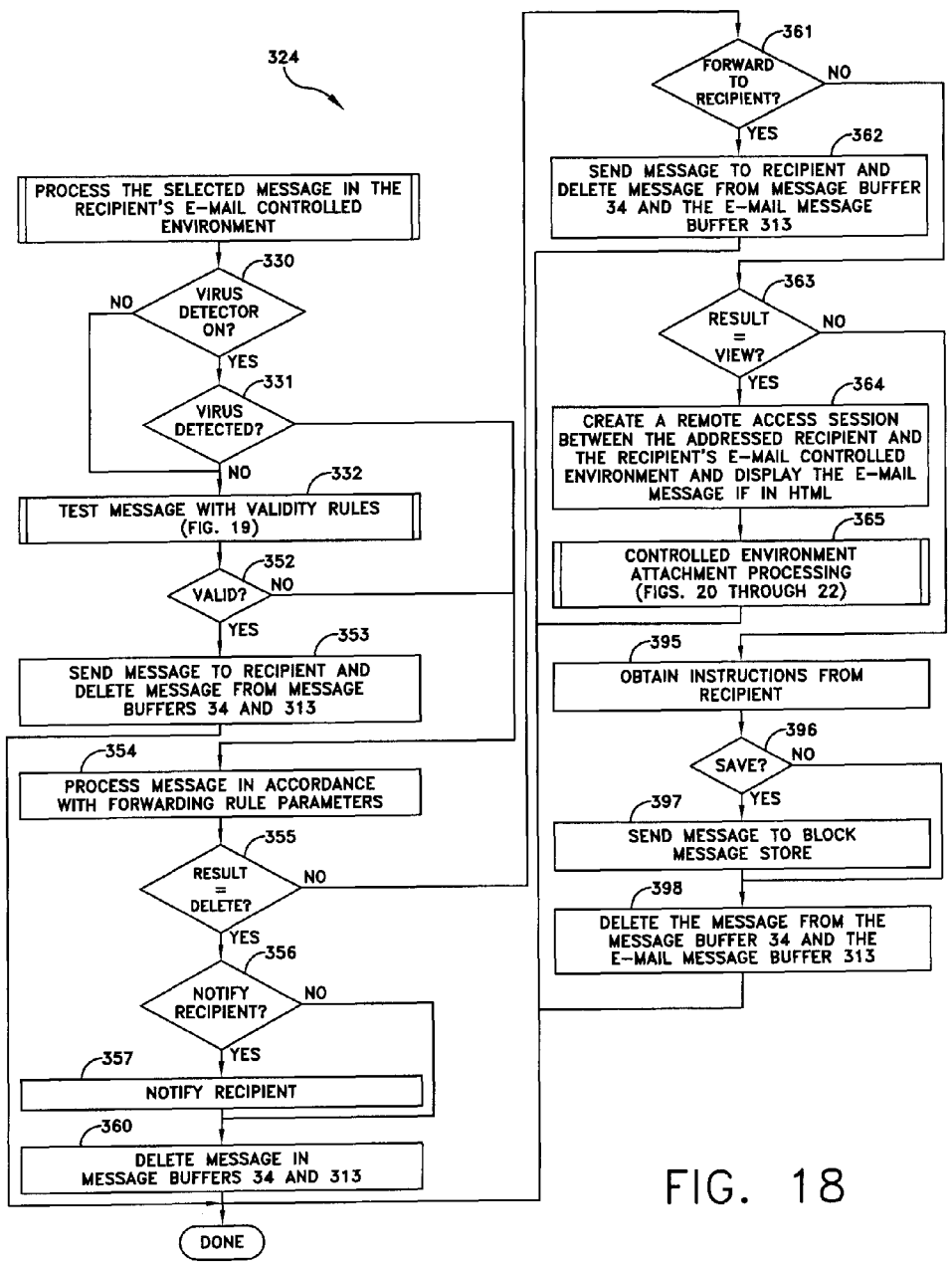
FIG. 18 constitutes a flow diagram of a process by which a selected message is handled in an e-mail controlled environment set.

Now referring to FIG. 18 and the details of the process 324, message criteria determine whether the incoming e-mail message is free of any known virus as defined by the virus detector 315. Step 330 represents a switch that determines whether any virus detection will occur. The administrator normally controls this switch.

If the switch is "ON", step 330 transfers control to step 331 that processes the message with the virus detector 315 in FIG. 17 to determine whether any e-mail message characteristics match any definition provided by the known virus detector 315. If no virus is detected, the message either is actually free of any virus or is a false negative. Step 331 transfers control to process 332 that tests the message with respect to the validity rules 316. These rules can range from the simple to the complex.

Figure 19:
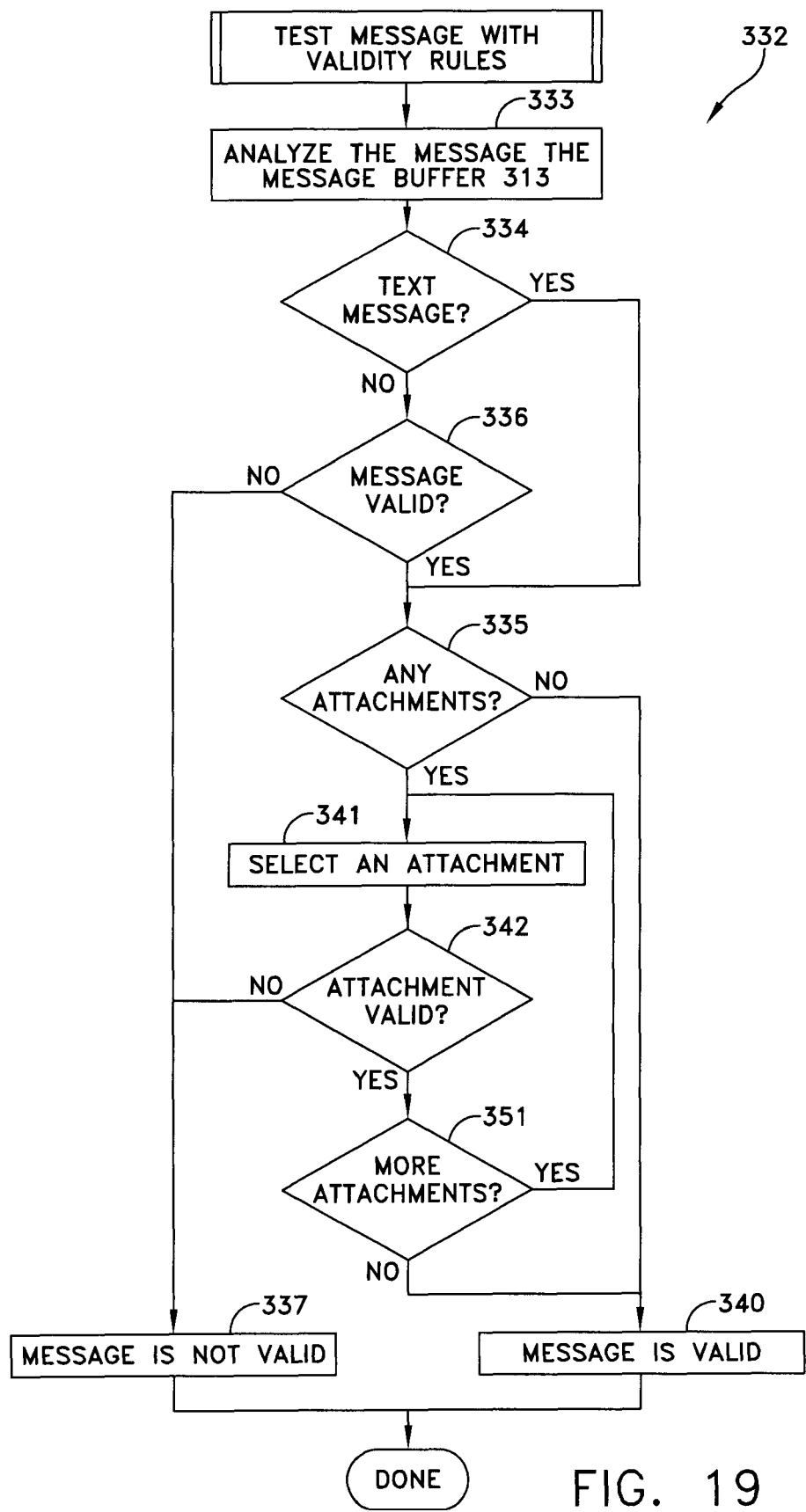
FIG. 19 is a more detailed flow diagram of a process shown in FIG. 18 by which a message is tested against certain validity rules.

In one implementation of this invention, the process 332 analyses the e-mail message as shown in FIG. 19. As known, e-mail messages can appear in text form or in non-text, typically HTML, form. If the e-mail message contains text, step 334 transfers control to step 335 to analyze any attachments. If the message is other than text, particularly an HTML message, step 334 transfers to step 336 to determine whether the message is valid. The procedure for making this determination will use the same steps as shown in FIG. 12. If the message is not valid, control passes to step 337 thereby to designate the message as being not valid. That is, while the message may actually be valid, it has not been proven to be valid; so it remains suspicious.

Assuming that the message is pure text or is otherwise valid, step 335 determines whether the e-mail message contains one or more attachments. If there are no attachments, step 335 transfers to step 340 to designate the message as being valid.

(2) Processing E-mail Attachments

If one or more attachments exist, step 341 selects an attachment for analysis in step 342. This analysis can have a wide range of testing. In one implementation the testing may use very simplified criteria. For example, if an analysis shows the attachment contains a macro of any type, the test can fail and step 342 can transfer control to step 337 to designate the message as not valid. Over time, however, more sophisticated analysis may be provided, such as identifying certain macros which are known not to be corrupting. In that case the analysis of step 342 would first determine whether which of the macros match one of the list of non-corrupting macros.

In even more sophisticated approaches it may be that the analysis will be detailed as described later with respect to FIGS. 20 and 21 using controlled environments that are related to the application that characterizes the attachment. For example, if the attachment is a word processing document, step 342 could implement an e-mail CE set 305 as shown in FIG. 17 with a word processor control environment 343 based upon a word processor ID 344 in the e-mail controlled environment data 81 for the recipient as shown in FIG. 16.

Similarly, FIG. 17 shows the use of an optional spreadsheet processor CE 345 selected on the basis of information contained in a spreadsheet processor ID field 346 in FIG. 16 and a PDF processor 347 based upon information contained in a PDF processor ID field 350 in FIG. 16.

In whatever approach, step 351 in FIG. 19 is a loop control that assures that the process of steps 341 and 342 continues until either an invalid attachment is identified or all the attachments have been processed. When all the attachments have been processed, all the attachments are valid so step 351 transfers control back to step 340 to deem the entire message and attachments as being valid.

If the process 332 in FIG. 19 determines the message to be valid, step 352 in FIG. 18 transfers control to step 353 that sends the message directly to the recipient for processing by the appropriate message type handling module in a normal manner. That is, the recipient processes the e-mail message and any attached files. Step 353 also deletes the message from the message buffer 34 in FIG. 1 and the e-mail message buffer 313 in FIG. 17.

If the various message criteria embodied in the virus detector 315 in FIG. 17 and the validity rules 316 determine that the e-mail message can not be deemed valid, step 352 transfers control to step 354 to process the message in accordance with message transmission criteria based upon the extracted forwarding rules 317 in FIG. 17. Specifically, step 354 uses the status of the prior testing, other information and the forwarding rules 317 to identify a disposition for the message. The general implementation of forwarding rules in the forwarding rules store 52 and forwarding rules buffer 317 will be known to a person of ordinary skill in the art. Other information may include input parameters such as: (1) specific user identification or user class specification, (2) a status parameter that modifies a response on the basis of the message status, such as whether the message was previously processed by the validity rules, (3) a source address (e.g., a "trusted source") list and (4) user authority. Each forwarding rule uses a combination of these parameter values and generates a rule output that controls the e-mail message destination or outcome. FIG. 18 depicts four possible destinations or outcomes, namely: (1) the e-mail message is deleted, (2) the e-mail message is forwarded to the recipient even though it has not been proven to be valid (step 353), (3) the e-mail message is made available to the recipient by remote viewing, or (4) the message is sent to a blocked message store for subsequent processing.

Step 355 determines whether the rule output requires the deletion of the message. If it does, the rule output may also establish a notification protocol represented by steps 356 and 357 that will notify the recipient that the message has been received and deleted without being transferred to the recipient. Step 360 represents the procedure for deleting the message from the message buffer 34 and the e-mail message buffer 313. This process may actually delete the message, with or without the generation of audit information, or merely designate the message for later deletion by a utility application.

The second possible rule output is that the message is to be forwarded to a recipient under controlled circumstances. For example, a recipient may be empowered to receive an e-mail message that is not found to be valid provided the message is being sent from a trusted source. In that case step 361 permits step 362 to forward the message to the recipient. Step 362 also deletes the message from the message buffer 34 and the e-mail message buffer 313.

Still another possible rule output allows the recipient limited access to the message, but under controls that prevent any inadvertent transfer of the message to the recipient. In that event, steps 355, 361 and 363 transfer control to step 364. Step 364 creates a remote access session between the recipient and the e-mail CE set for the e-mail program and recipient. Basically step 364 establishes a link between the remote access communications module 320 in the e-mail master CE 306 in FIG. 17 and the remote access program module associated with the recipient, such as the remote access program module 55 associated with recipient 13(1) in FIG. 1. All output from the e-mail CE set 305, as a host computer, is then replicated to the recipient's computer system acting as a remote viewer and controller. More specifically, step 364 displays the e-mail message remotely if the message is HTML; otherwise a text message is transferred directly to the recipient with a notification that all the attachments need to be reviewed remotely.

Figure 20:
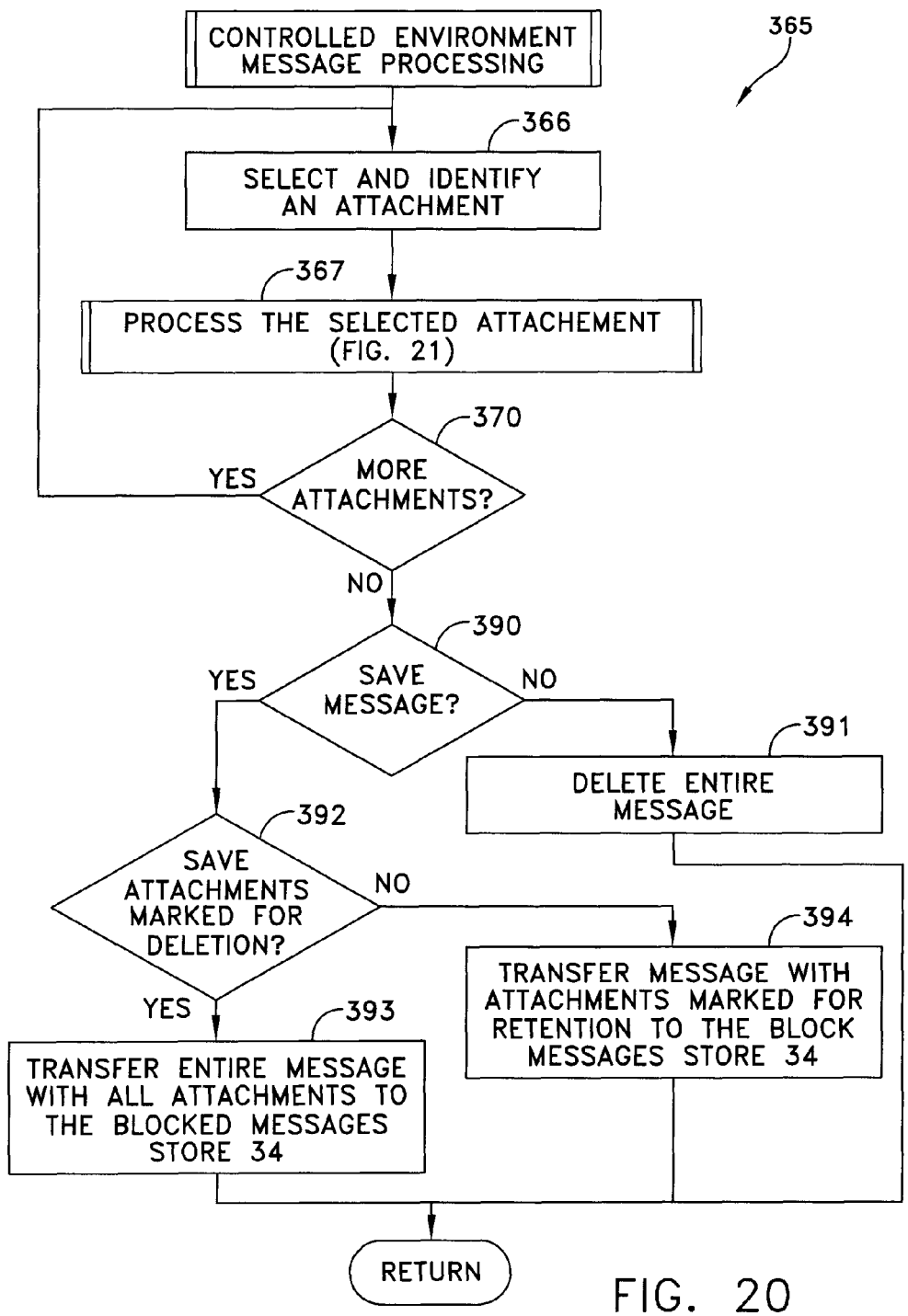
FIG. 20 is a flow diagram of a process shown in FIG. 18 by which e-mail attachments are tested.
Figure 21:
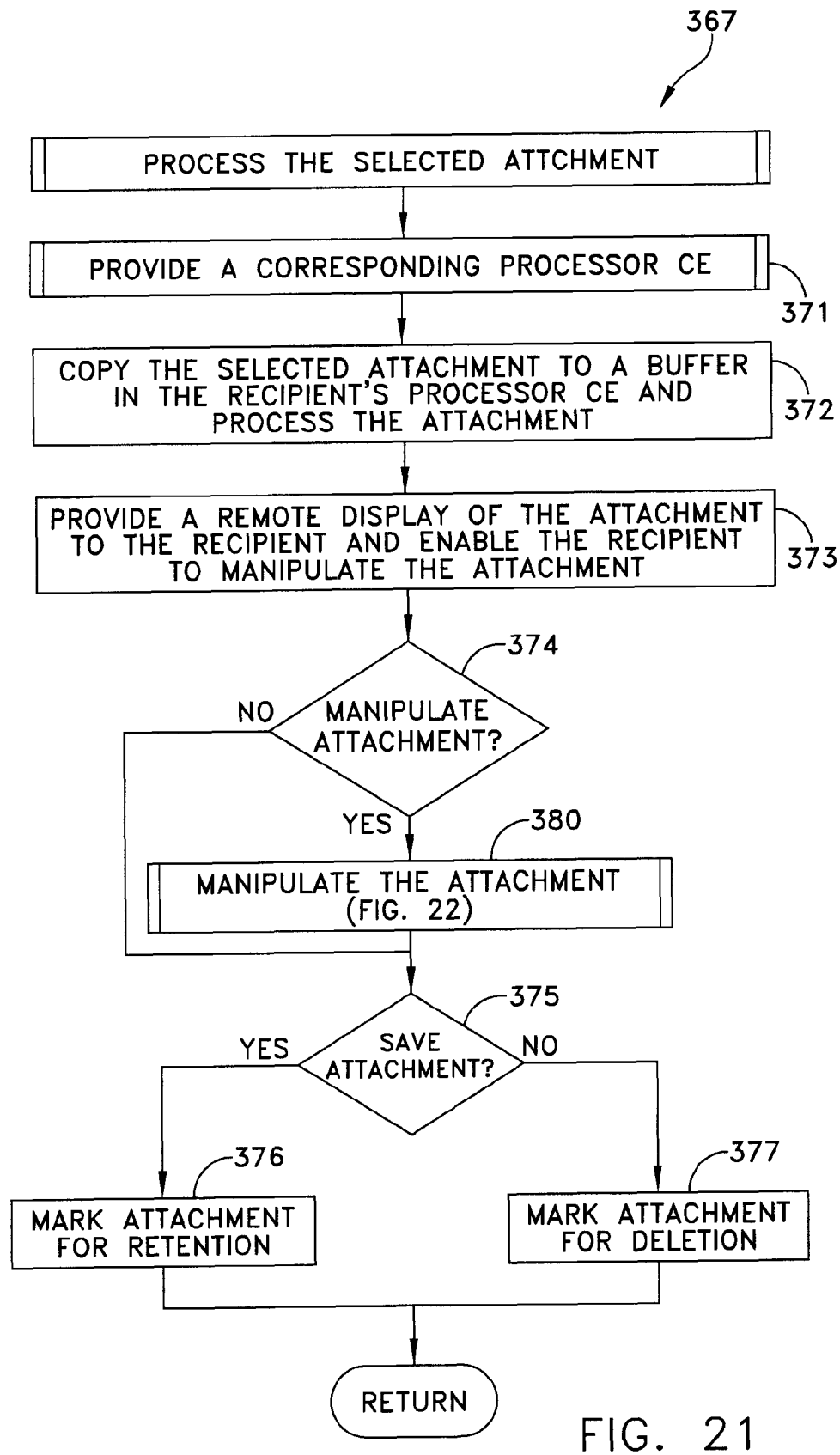
FIG. 21 is a flow diagram of a specific process for implementing an e-mail attachment process shown in FIG. 20.

If an e-mail message contains one or more attachments, a process 365 in FIG. 18 provides a method for processing and displaying the information in those attachments as shown in FIGS. 20 and 21. FIG. 20 provides an overview in which step 366 selects and identifies an attachment in the e-mail message buffer 313. Step 366 selects one of those attachments for analysis by process 367 shown in more detail in FIG. 21. Each attachment is then processed. A loop control decision block 370 allows each attachment to be processed in an orderly manner.

Referring to FIG. 21, the process begins by using a process 371 to provide a corresponding processor CE. Each attachment will correspond to a particular one of the production processors 25 in FIG. 1. A corresponding controlled environment needs to exist in the e-mail master CE set for the recipient. If it does not, the process 371 obtains one from the CE pool 42 in FIG. 1 using a procedure like the procedure depicted in FIG. 8. Further, the production processor CE for an e-mail attachment generated from a template will be the same as a production processor CE used for processing a download during a browser session.

Step 372 represents the process of copying the selected attachment to a buffer in the recipient's production application CE for that particular production program. That is, if the attachment is a word document, the attachment will be copied to a buffer in the word processor CE 343 of FIG. 17. Processing then occurs with one of a possible number of other forwarding rules being generated.

The attachment can now be processed in an appropriate production application CE for the recipient and e-mail message protocol; for example, the word processor CE 343 in FIG. 17 for to a word processor attachment or the spreadsheet processor CE 345 for a spreadsheet attachment.

Step 373 represents the remote display of the attachment on the recipient's screen and enablement of communications whereby the recipient can interact with the corresponding production application CE. Generally the recipient will have the option to manipulate the attachment in this production application CE.

If the recipient elects not to manipulate the attachment, step 374 transfers to step 375 where either the forwarding rules or the recipient determine whether the attachment is to be saved or deleted. If the message is to be saved, step 376 marks the attachment for retention in the blocked messages store 54 in FIG. 1. Otherwise step 377 marks the attachment for deletion.

Figure 22:
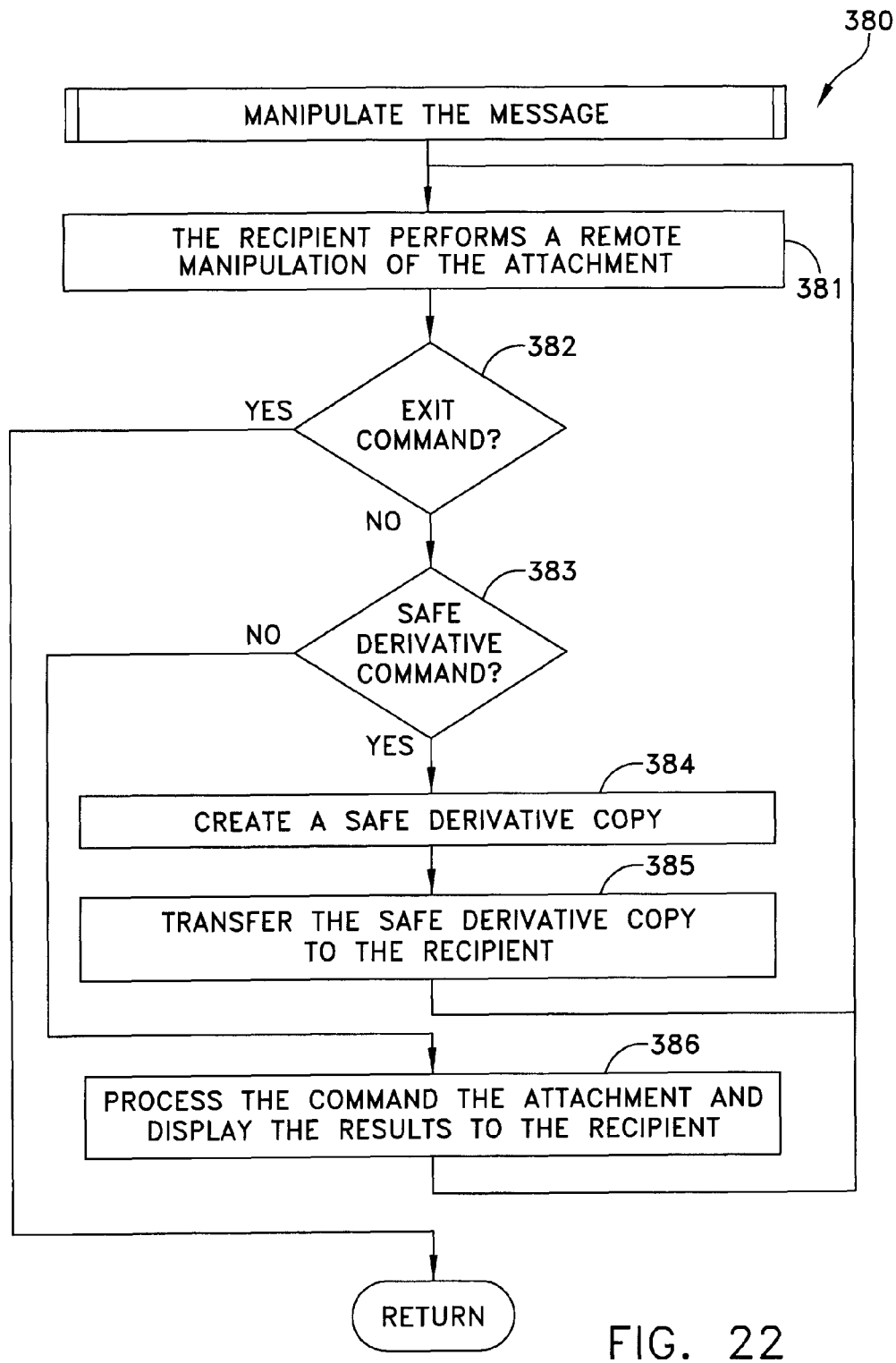
FIG. 22 is a flow diagram of a process used by the process in FIG. 21.

If the recipient decides to manipulate the attachment, all processing occurs in the production application CE associated with the attachment according to a process 380 shown in greater detail in FIG. 22. Manipulation allows a recipient to view and alter an attachment that is suspect. If, for example, the attachment is a word processing document, the process 380, particularly step 381 in FIG. 22, allows the recipient to edit the document remotely in the word processor CE 343. The process 380 provides the recipient a number of options after one or more manipulations occur.

If the recipient performs some manipulations, but does not need to save the revised attachment, the recipient elects to "exit" the procedure. Step 382 then causes processing to return to step 375 in FIG. 1. No additional processing occurs.

In some situations, the recipient may desire to produce a "safe derivative" version of the attachment. In that case steps 382 and 383 transfer to step 384 to implement a process by which the displayed attachment is converted into a safe or clean form, called a "derivative". For example, if the attachment being displayed is a word processing or spreadsheet file, step 384 might initiate a process for converting the word processing or spreadsheet file into a derivative PDF file thereby stripping any macros associated with the attachment. After the conversion is complete, step 385 transfers the safe derivative document to the recipient. As it is safe, the receipt of the PDF document poses no risk of corrupting the recipient computer system. Then the process returns to step 381 to allow further manipulation.

It is also possible to provide a recipient with other manipulation options. If the recipient selects one such option after performing a set of manipulations, control passes to step 386 to process the option and then return control to step 386.

Manipulations continue until the recipient elects to exit whereupon step 382 in FIG. 22 returns control to step 375 in FIG. 21.

When the process of FIG. 22 has been completed, control returns to step 370 that then transfers control to step 390 to determine the final disposition of the message including its attachments. If the recipient elects not to save the message, control transfers to step 391 to delete the entire message including all the attachments, if any.

If the recipient elects to save the message, control transfers to step 392 that enables the save all of the message or only portions of the message. If the recipient elects to save all the message, step 393 enables the entire message to be transferred to the blocked messages store 54 in FIG. 1. Otherwise, step 394 enables the message with only those attachments marked for retention to transfer to the blocked messages store 54. Steps 391, 393 and 394 may, in different embodiments, perform the transfer directly or mark the messages for subsequent transfer by a utility. This completes the process by which a message is viewed and enabled for manipulation.

Referring again to FIG. 18, step 395 represents another possible disposition. In this example, step 395 requests instructions from the recipient. Typically the options are to save or delete the message. If step 396 determines that the recipient asks to save the message, step 397 transfers the message to the blocked messages store 54 in FIG. 1. Step 398 deletes the message from the message buffer 34 in FIG. 1 and the e-mail message buffer 313 in FIG. 17.

Now looking at this invention from the perspective of a recipient, one of two possible events will occur upon receipt of an e-mail message. If the message is determined to be valid, the recipient processes the message. In this event, the operation of the invention is transparent to the recipient. Moreover, the recipient interacts with the message normally.

The second possible event occurs if the message is not deemed to be valid. Then the forwarding rules control the notice to the recipient. That notice will also indicate whether the message is available for viewing and possible interaction or manipulation on a restricted basis or not available. Any transfer of the message to the recipient is tightly controlled.

Other Processes

FIG. 6 also discloses controls for VoIP, IM and other message protocols. It will now be apparent that each of these protocols can be processed using the basic procedures illustrated by example with respect to browser and e-mail messages. That is, in the immunization system of this invention, each control is characterized by a protocol-based controlled environment (CE) set for a single recipient that includes:

1) A protocol-based master CE that:
  i) includes at least some, if not all, message criteria to determine if a corresponding protocol message can be deemed to be valid or can only be deemed to be suspicious;
  ii) includes at least some, if not all, transmission criteria to determine whether the message is sent to the recipient, is made available to the recipient through remote access or is sent to some other destination;

2) At least one protocol-based CE that corresponds to the message protocol;

3) Optionally, at least one production application CE that is adapted to process any attachments associated with an incoming message and that includes message criteria and transmission criteria; and 4) A remote access capability to enable interaction between a recipient and the controlled environment.

It will now be apparent that this invention has been disclosed in terms of certain embodiments, but that many modifications can be made to the disclosed apparatus and methodology without departing from the invention. FIGS. 1 through 22 depict specific logical representations of this invention from which diverse implementations will be apparent to those skilled in the art. For example, the flow charts represent specific functional sequences of procedures or steps. These specific sequences can be altered. Other implementations could incorporate functional equivalents through a hardware decision tree logic circuit or a coded module that monitors a number of inputs to generate a signal or signal sequence as a rule output. Therefore, it is the intent of the appended claims to cover all such variations and modifications as come within the true spirit and scope of this invention.

What is claimed is:

1. A method for immunizing a recipient's computer system in a data processing network from all corrupting contents of all incoming messages received over a communications path through a server wherein each incoming message requires at least one production application for processing the message, said method comprising, for each incoming message, the steps of:

A) identifying each of the at least one production application required for processing the message, B) generating a controlled environment set for the message as an instance of controlled environment templates stored in the server, said generated controlled environment set being isolated from the data processing network and other portions of the server and including an instance of a controlled environment for processing each identified production application, each production application including at least one predetermined message criterion that defines those characteristics of the message required to prove that the message could not corrupt the recipient's computer system and including transmission criteria that define dispositions for the identified message, C) analyzing the message by processing all of its contents in said generated controlled environment set to determine whether the message meets all of the at least one message criterion that proves that the entire message is free of any corrupting contents, and D) disposing of the message in response to said analyzing step and the transmission criteria for the message, one said disposing step enabling the message to be transferred to the recipient's computer system without modification only when said analyzing step determines that the entire message has been proven to be free of corrupting contents and another disposing step providing a communications path whereby the recipient can view the message remotely and in isolation in the controlled environment set without transferring the message to the recipient's computer system.

2. A method as recited in claim 1 wherein a message is received as at least one data packet of a given protocol, said method including the step of identifying the message protocol and recipient for the message, said generation of a controlled environment set for a given message includes generating a master controlled environment that controls the operation of any generated production application controlled environment in response to the identified message protocol and recipient.

3. A method as recited in claim 1 capable of receiving messages in any of a plurality of protocols and as at least one data packet, said method including the step of identifying the message protocol, said generation of a controlled environment set for a given message includes generating a master controlled environment that controls the operation of any generated production application controlled environment in response to the identified message protocol and recipient.

4. A method as recited in claim 1 wherein a message is received as at least one data packet of a given protocol and wherein the server connects to a plurality of recipients, said controlled environment set generating step includes generating an instance of a controlled environment set for each combination of the given message protocol and recipient.

5. A method as recited in claim 4 wherein a recipient receives messages of diverse protocols and wherein said controlled environment generating step includes determining the protocol of and recipient for the incoming message whereupon the message is directed to an instance of the controlled environment set for that message protocol and the recipient.

6. A method as recited in claim 5 wherein the messages are HTTP messages processed by a browser, said generating of a controlled environment set for the browser and recipient including:
   i) generating a browser master controlled environment, and
   ii) generating at least one browser application controlled environment including a first browser application controlled environment constituting a shadow browser controlled environment that corresponds to the browser in the recipient's computer system and that operates under the control of the browser master controlled environment.

7. A method as recited in claim 6 wherein, in response to a recipient's initiation of a transmission of an HTTP message, the browser master control causes each of the browser application controlled environments to transmit an outgoing HTTP message with a unique return address whereby a plurality of outgoing messages are sent to a specific site, and wherein each of the responsive incoming messages are processed in the browser application controlled environment that transmitted the corresponding outgoing HTTP message.

8. A method as recited in claim 7 wherein the message contains HTML content and certain message criteria define valid HTML content, said message analysis including analyzing at least one of the incoming messages a browser application controlled environment with respect to the HTML content and message criteria.

9. A method as recited in claim 7 wherein said analyzing step determines whether all the incoming messages are identical in accordance with at least one other message criterion and wherein the disposition of the is dependent on the results of said analyzing step and at least one transmission criterion.

10. A method as recited in claim 9 wherein said analyzing step fails to determine that messages are identical, said analyzing step including selecting at least one message for further analysis and analyzing the at least one selected message for the required characteristics.

11. A method as recited in claim 10 wherein one transmission criterion limits transmission of the message to browser application controlled environments in the controlled environment set.

12. A method as recited in claim 9 wherein said analyzing step includes conducting a comparative analysis of all the incoming HTTP messages and selecting one of the browser application controlled environments for processing the message.

13. A method as recited in claim 12 wherein said analyzing step is dependent upon the information about the recipient.

14. A method as recited in claim 5 wherein the messages are e-mail messages to be processed by an e-mail production application at the recipient's computer system, said generation of a controlled environment set for the e-mail message and recipient including:
   i) generating an e-mail master controlled environment for identifying the recipient and e-mail message, and
   ii) generating an e-mail production application controlled environment for processing the email message under the control of the e-mail master controlled environment.

15. A method as recited in claim 14 wherein said message criteria include validity rules that establish the validity for different types of e-mail messages.

16. A method as recited in claim 15 wherein said analysis of an e-mail message in accordance with the message criteria determines that a text only e-mail message is valid whereupon said disposing step transfers the message to the recipient's computer system.

17. A method as recited in claim 15 wherein said analysis of an e-mail message without attachments in accordance with the message criteria determines that the e-mail message is valid whereupon said disposing step transfers the message to the recipient's computer system.

18. A method as recited in claim 15 wherein the e-mail message includes at least one attachment and wherein said analysis of the e-mail message in accordance with the message criteria determines that the e-mail message and each of the at least one attachment meets the required characteristics whereupon said disposing step transfers the message and the attachments to the recipient's computer system.

19. A method as recited in claim 15 wherein the e-mail message is analyzed in accordance with message criteria that detect the existence of a virus in the e-mail message.

20. A method as recited in claim 14 wherein the controlled environment set defines a link between the recipient's computer system and an e-mail controlled environment set for the recipient thereby to enable said disposing step provide the recipient with limited access to the controlled environment set to view the message.

21. A method as recited in claim 14 wherein one disposing step deletes the e-mail message from the controlled environment set.

22. A method as recited in claim 21 wherein said deletion of the e-mail message generates a notification to the recipient's computer system.

23. A method as recited in claim 14 wherein the server includes a blocked message store and one disposing step enables the recipient to store the e-mail message in the blocked message store.

24. An immunization system for immunizing a recipient's computer system in a data processing network from all corrupting contents of all incoming messages received over a communications path through a server with a controlled environment template store wherein each incoming message requires at least one production application for processing the message, said system comprising a processor executing software configured to implement, for each incoming message:
   A) means for identifying each of the at least one production application required to process the message,
   B) a controlled environment set that is isolated from the data processing network and other portions of the server and that includes a controlled environment for processing each identified production application, each controlled environment in said controlled environment set being an instance of a controlled environment template in the controlled environment template store and including:
      i) at least one predetermined message criterion that defines those characteristics required to prove that the message could not corrupt the recipient's computer system, and
      ii) transmission criteria that define dispositions for the identified message,
   C) means for analyzing all of the contents of the message by processing the message contents in a corresponding controlled environment set to determine whether the message meets all of the at least one message criterion that proves that the entire message is free of any corrupting contents, and
   D) disposition means responsive to analyzing mean for controlling the disposition of the message, one disposition enabling the message to be transferred to the recipient's computer system without modification only when said analyzing step determines that the entire message has been proven to be free of corrupting contents and another disposition providing a communications path whereby the recipient can view the message remotely and in isolation in the controlled environment set without transferring the message to the recipient's computer system.

25. A system as recited in claim 24 wherein a message is received as at least one data packet of a given protocol and wherein said identification means identifies the message protocol and recipient for the message and said controlled environment set for a given protocol and recipient includes a master controlled environment that controls the operation of any generated production application controlled environment in response to the identified message protocol and recipient.

26. A system as recited in claim 24 wherein messages are received in a plurality of protocols and as at least one data packet, said identification means for each application including means for determining the protocol for each incoming message and means for directing the message to a controlled environment set for the given protocol and recipient.

27. A system as recited in claim 24 wherein a message is received as at least one data packet of a given protocol and wherein the server connects to a plurality of recipients, said controlled environment set for a given message being an instance of a controlled environment set adapted for the message protocol and recipient.

28. A system as recited in claim 27 wherein a recipient receives messages of diverse protocols and wherein said identifying means includes means for determining the production applications for and recipient for an incoming message, said system including means for directing the message to an instance of the controlled environment set for one of the identified production applications and the given recipient.

29. A system as recited in claim 28 wherein the messages are HTTP messages processed by a browser, said controlled environment set for the browser and recipient including:
   i) a browser master controlled environment for controlling the processing of the message, and
   ii) at least one browser application controlled environment including a first browser application controlled environment constituting a shadow browser controlled environment that corresponds to the browser in the recipient's computer system and that operates under the control of said browser master controlled environment.

30. A system as recited in claim 29 wherein, in response to a recipient's initiation of a transmission of an HTTP message, said browser master control causes each of the browser application controlled environments to transmit an outgoing HTTP message with a unique return address whereby a plurality of outgoing messages are sent to a specific site and wherein each of said browser application controlled environments processes an incoming message responsive to the outgoing message therefrom.

31. A system as recited in claim 30 wherein the message contains HTML content and certain message criteria define valid HTML content wherein said means for implementing an analysis in said controlled environment set includes means for analyzing at least one of the incoming messages to the browser application controlled environment with respect to the HTML content and message criteria.

32. A system as recited in claim 30 wherein said browser master controlled environment determines whether all the incoming messages are identical in accordance with other message criteria and wherein said disposition means operation is dependent on said analysis.

33. A system as recited in claim 32 wherein said browser controlled environment set fails to determine that messages are identical, said browser master controlled environment including means for selecting at least one message for analysis, said means for implementing the analysis including means for analyzing the at least one selected message for the required characteristics.

34. A system as recited in claim 33 including means responsive to one transmission criterion for limiting transmission of the message to browser application controlled environments in the controlled environment set.

35. A system as recited in claim 32 wherein said browser master controlled environment includes means for comparatively analyzing all the incoming HTTP messages and selecting one of the browser application controlled environments for processing the message.

36. A system as recited in claim 35 including means for providing information about the recipient for said analyzing means.

37. A system as recited in claim 28 wherein the messages are e-mail messages to be processed by an e-mail production application at the recipient's computer system, said controlled environment set for the e-mail message and recipient including:

i) an e-mail master controlled environment for controlling the processing of an incoming e-mail message and identifying the recipient and e-mail message, and ii) an e-mail production application controlled environment for processing the e-mail message under control of the e-mail master controlled environment.

38. A system as recited in claim 37 wherein said message criteria include validity rules that establish the validity for different types of e-mail messages.

39. A system as recited in claim 38 wherein said means for analyzing an e-mail message in accordance with the message criteria includes means for determining that the e-mail message is text only whereupon said disposition means enables the transfer of the message to the recipient's computer system.

40. A system as recited in claim 38 wherein said means for analyzing an e-mail message without attachments in accordance with the message criteria includes means for determining that the e-mail message meets the required characteristics whereupon said disposition means enables the transfer of the message to the recipient's computer system.

41. A system as recited in claim 38 wherein the e-mail message includes at least one attachment and wherein said means for analyzing the e-mail message in accordance with the message criteria includes means for determining that the e-mail message and each attachment meet the required characteristics said disposition means enables the transfer of the e-mail message and attachments to the recipient's computer system.

42. A system as recited in claim 38 wherein the e-mail controlled environment set includes means for detecting the existence of a virus in the e-mail message.

43. A system as recited in claim 37 wherein said controlled environment set includes means for establishing a link between the recipient's computer system and the e-mail controlled environment set for the recipient thereby to enable said disposition means to provide the recipient limited access to the controlled environment set to view the message.

44. A system as recited in claim 37 wherein said disposition means includes means for deleting the e-mail message from the e-mail controlled environment set.

45. A system as recited in claim 44 including means for generating a notification for transfer to the recipient's computer system in response to the deletion of the e-mail message.

46. A system as recited in claim 37 wherein the server includes a blocked message store and wherein said disposition means includes means for enabling the recipient to store the e-mail message in the blocked message store.

\* \* \* \* \*